(12) United States Patent
Zeng et al.

(10) Patent No.: US 12,267,272 B2
(45) Date of Patent: Apr. 1, 2025

(54) SCHEDULING METHOD, NETWORK DEVICE, AND TERMINAL

(71) Applicant: VIVO MOBILE COMMUNICATION CO.,LTD., Guangdong (CN)

(72) Inventors: Chaojun Zeng, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 463 days.

(21) Appl. No.: 17/669,497

(22) Filed: Feb. 11, 2022

(65) Prior Publication Data

US 2022/0166589 A1 May 26, 2022

Related U.S. Application Data

(63) Continuation of application No. PCT/CN2020/102334, filed on Jul. 16, 2020.

(30) Foreign Application Priority Data

Aug. 12, 2019 (CN) .......................... 201910741476.3

(51) Int. Cl.
*H04L 5/00* (2006.01)
(52) U.S. Cl.
CPC .......... *H04L 5/0053* (2013.01); *H04L 5/0051* (2013.01)
(58) Field of Classification Search
CPC ... H04L 1/1893; H04L 5/0044; H04L 5/0094; H04L 1/08; H04L 5/0051; H04L 5/0055; H04L 5/0007; H04L 5/0048; H04L 1/1861; H04L 5/0012; H04L 27/261; H04L 27/2601; H04L 25/0226; H04L 27/2646; H04W 72/1268; H04W 72/20;
(Continued)

(56) References Cited

U.S. PATENT DOCUMENTS 9,548,845 B2 * 1/2017 Yi .......................... H04W 72/51
9,843,429 B2 * 12/2017 Yi ........................... H04W 4/70
9,893,853 B2 * 2/2018 Yi .......................... H04L 5/0053
(Continued)

FOREIGN PATENT DOCUMENTS

CN 101860425 A 10/2010
CN 107431577 A 12/2017
(Continued)

OTHER PUBLICATIONS

Lenovo, Motorola Mobility, "HARQ enhancement for NR-U", 3GPP TSG RAN WG1 #97, R1-1906283, Reno, USA, May 13-17, 2019.

(Continued)

*Primary Examiner* — Jung Liu
(74) *Attorney, Agent, or Firm* — Price Heneveld LLP

(57) ABSTRACT

A scheduling method, a network device, and a terminal. The method includes: sending downlink control information DCI for scheduling N physical channels, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, and N is an integer greater than or equal to 1.

20 Claims, 3 Drawing Sheets

(58) Field of Classification Search
CPC .............. H04W 72/23; H04W 72/0446; H04B 7/0452; H04B 7/12; H04B 1/713; Y02D 30/70

See application file for complete search history.

(56) References Cited

U.S. PATENT DOCUMENTS

| | | | | |
|---|---|---|---|---|
| 10,455,514 | B2* | 10/2019 | Oh | H04W 52/42 |
| 10,567,137 | B2* | 2/2020 | Yi | H04L 5/0053 |
| 10,575,299 | B2* | 2/2020 | Ying | H04W 72/23 |
| 10,708,027 | B2* | 7/2020 | Yi | H04L 5/0053 |
| 10,952,231 | B2* | 3/2021 | Liou | H04L 5/001 |
| 10,958,397 | B2* | 3/2021 | Yi | H04L 5/0053 |
| 11,101,956 | B2* | 8/2021 | Kim | H04L 5/0051 |
| 2016/0135170 | A1* | 5/2016 | Chen | H04L 1/08 370/336 |
| 2018/0027547 | A1* | 1/2018 | Lyu | H04W 72/51 370/329 |
| 2018/0145813 | A1* | 5/2018 | Yi | H04W 76/27 |
| 2019/0037586 | A1* | 1/2019 | Park | H04L 5/00 |
| 2019/0045556 | A1* | 2/2019 | Bagheri | H04W 72/23 |
| 2019/0053211 | A1* | 2/2019 | Ying | H04W 72/044 |
| 2019/0199477 | A1* | 6/2019 | Park | H04L 5/00 |
| 2019/0229875 | A1* | 7/2019 | Yi | H04W 76/27 |
| 2020/0120642 | A1* | 4/2020 | Hwang | H04L 5/0048 |
| 2020/0120651 | A1* | 4/2020 | Ma | H04L 1/0061 |
| 2020/0136781 | A1* | 4/2020 | Yi | H04W 76/27 |
| 2020/0266946 | A1* | 8/2020 | Kim | H04L 27/261 |
| 2020/0389879 | A1 | 12/2020 | Zhang et al. | |
| 2021/0022164 | A1* | 1/2021 | Chen | H04L 5/1469 |
| 2021/0329676 | A1* | 10/2021 | Yang | H04W 4/46 |
| 2021/0329684 | A1* | 10/2021 | Yang | H04W 72/1268 |
| 2021/0345370 | A1* | 11/2021 | Lee | H04L 1/1854 |
| 2021/0385036 | A1* | 12/2021 | Bae | H04L 5/0044 |
| 2022/0053528 | A1* | 2/2022 | Li | H04W 72/1268 |
| 2022/0191903 | A1* | 6/2022 | Bae | H04L 1/1893 |

FOREIGN PATENT DOCUMENTS

| | | |
|---|---|---|
| CN | 108633061 A | 10/2018 |
| CN | 109600836 A | 4/2019 |
| CN | 109688627 A | 4/2019 |
| CN | 109792746 A | 5/2019 |
| CN | 111278131 A | 6/2020 |
| EP | 3905762 A1 | 11/2021 |
| KR | 20190027705 A | 3/2019 |
| WO | 2019099533 A1 | 5/2019 |

OTHER PUBLICATIONS

Qualcomm Incorporated, "Enhancements to Scheduling and HARQ operation for NR-U", 3GPP TSG RAN WG1 Meeting #97 R1-1907263, Reno, US, May 13-May 17, 2019.

Huawei, "Feature lead summary of HARQ enhancements for NR-U", 3GPP TSG RAN WG1 Meeting #97. R1-1907652, Reno, USA, May 13-17, 2019.

* cited by examiner

SCHEDULING METHOD, NETWORK DEVICE, AND TERMINAL

CROSS-REFERENCE OF RELATED APPLICATION

This application is a continuation application of International Application No. PCT/CN2020/102334 filed on Jul. 16, 2020, which claims priority to Chinese Patent Application No. 201910741476.3 filed in China on Aug. 12, 2019, which are incorporated herein by reference in their entireties.

TECHNICAL FIELD

The present disclosure relates to the field of communications technologies, and in particular, to a scheduling method, a network device, and a terminal.

BACKGROUND

A time domain resource assignment solution in uplink multi-transmission time interval (TTI) scheduling in new radio (NR for short)-based access to unlicensed spectrum (NR-U) includes: when there is no gap (Gap) between one or more physical uplink shared channels (PUSCH) scheduled by a single piece of downlink control information (DCI), to indicate a symbol allocation status of each of multiple slots, a time domain resource assignment table in NR is still used, but S and L (or SLIV) parameters are reinterpreted as follows:

A start symbol S is applied to the first slot of scheduled multiple slots, and the first slot ends at symbol 13, that is, all remaining symbols starting from the S symbol in this slot are occupied. L consecutive symbols allocated are applied to the last slot of the scheduled multiple slots, and the last slot starts at symbol 0, that is, symbols 0 to (L−1) in this slot are occupied. Slots other than the first slot and the last slot of the scheduled multiple slots occupy symbols 0 to 13, that is, all symbols in these slots are occupied.

When there is a gap between one or more PUSCHs scheduled by a single piece of DCI, time domain resource assignment during PUSCH aggregation in NR is still used, that is, S and L are repeatedly applied in each scheduled slot, the number of scheduled slots can be indicated by a newly added field in the DCI, and different TBs are transmitted in each slot.

However, the time domain resource assignment method in multi-TTI scheduling in related NR-U is inflexible.

SUMMARY

The embodiments of the present disclosure provide a scheduling method, a network device, and a terminal.

According to a first aspect, some embodiments of this disclosure provide a scheduling method, applied to a network device. The scheduling method includes:

sending downlink control information DCI for scheduling N physical channels, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, and N is an integer greater than or equal to 1.

According to a second aspect, some embodiments of this disclosure provide a scheduling method, applied to a terminal. The scheduling method includes: receiving downlink control information DCI for scheduling N physical channels, where the DCI includes first indication information, the first indication information is used to indicate a resource allocation set, configuration of the resource allocation set includes a dedicated transmission parameter group corresponding to a physical channel, and N is an integer greater than or equal to 1; and determining transmission parameters of the N physical channels according to the resource allocation set.

According to a third aspect, some embodiments of the present disclosure further provide a network device, including:

a sending module, configured to send downlink control information DCI for scheduling N physical channels, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, and N is an integer greater than or equal to 1.

According to a fourth aspect, some embodiments of the present disclosure further provide a terminal, including:

a receiving module, configured to receive downlink control information DCI for scheduling N physical channels, where the DCI includes first indication information, the first indication information is used to indicate a resource allocation set, configuration of the resource allocation set includes a dedicated transmission parameter group corresponding to a physical channel, and N is an integer greater than or equal to 1; and a first determining module, configured to determine transmission parameters of the N physical channels according to the resource allocation set.

According to a fifth aspect, some embodiments of the present disclosure further provide a network device, including: a processor, a memory, and a program stored in the memory and executable on the processor, where when the program is executed by the processor, the step of the scheduling method according to the first aspect are implemented.

According to a sixth aspect, some embodiments of the present disclosure further provide a terminal, including: a processor, a memory, and a program stored in the memory and executable on the processor, where when the program is executed by the processor, the steps of the scheduling method according to the second aspect are implemented.

According to a seventh aspect, some embodiments of the present disclosure further provide a readable storage medium. The readable storage medium stores a program, and when the program is executed by a processor, steps of the scheduling method according to the first aspect or the scheduling method according to the second aspect are implemented.

DETAILED DESCRIPTION OF THE EMBODIMENTS

The following clearly and completely describes the technical solutions in some embodiments of the present disclosure with reference to the accompanying drawings in some embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
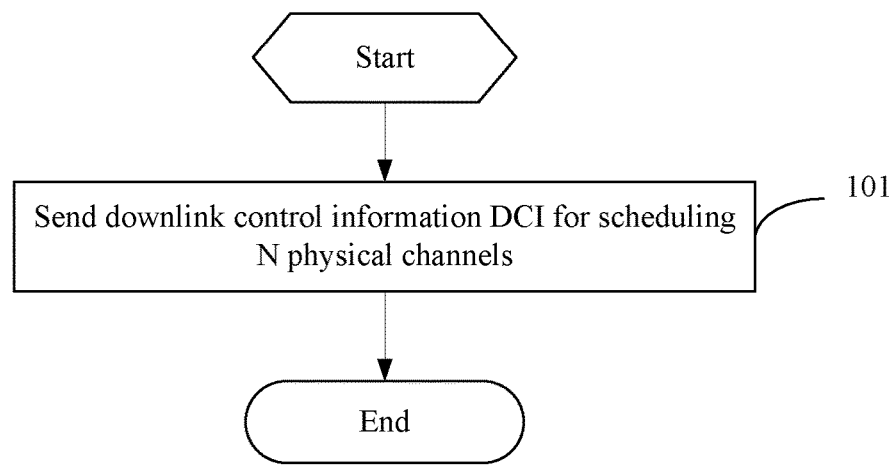
FIG. 1 is a first flowchart of a scheduling method according to some embodiments of the present disclosure.

Referring to FIG. 1, FIG. 1 is a first flowchart of a scheduling method according to some embodiments of the present disclosure. As shown FIG. 1, this embodiment provides a scheduling method, applied to a network device. The method includes the following steps:

Step 101: Send downlink control information DCI for scheduling N physical channels, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, and N is an integer greater than or equal to 1.

Specifically, the first indication information is used to indicate the resource allocation set, the transmission parameters of the N physical channels may be determined according to the resource allocation set, and N is an integer greater than or equal to 1. The network device can determine transmission parameters of one or more physical channels according to actual requirements by setting the resource allocation set, and flexibly adjust the number of determined physical channels and transmission parameters of the physical channels. The physical channel can be a physical uplink shared channel (PUSCH) or a physical downlink shared channel (PDSCH).

The meaning of the term "dedicated" in the independent transmission parameter group in a specific embodiment of the present disclosure can also be understood as "independent", that is, the dedicated transmission parameter group is only used to determine a transmission parameter of a corresponding physical channel, and is not used to determine transmission parameters for other physical channels.

Different from the related technology, in the scheduling method of the specific embodiment of the present disclosure, the resource allocation set needs to be first determined based on the first indication information, and then the transmission parameter of the scheduled physical channel is determined based on the transmission parameter group configured in the resource allocation set.

That is, in the scheduling method of the specific embodiment of the present disclosure, only a resource allocation set needs to be indicated to determine final transmission parameters of all physical channels, which is unlike LTE in which a transmission parameter configuration solution corresponding to each physical channel needs to be indicated. Therefore, this method reduces signaling overheads.

At the same time, in the existing multi-TTI scheduling solution of the 5G system, one configuration solution is also indicated, but a parameter group in the configuration solution is used for all physical channels. In the scheduling method of the specific embodiment of the present disclosure, although one resource allocation set is also indicated, the resource allocation set at least includes a dedicated transmission parameter group corresponding to a physical channel, and the dedicated transmission parameter group is only used to determine a transmission parameter of a corresponding physical channel. This is unlike the existing multi-TTI scheduling solution of the 5G system in which the parameter group in the configuration solution is used to determine transmission parameters of all physical channels.

In other words, the specific embodiment of the present disclosure includes a one-to-one transmission parameter group, that is, a correspondence between a transmission parameter group and a physical channel is a one-to-one correspondence. In the existing multi-TTI scheduling solution of the 5G system, a correspondence between a transmission parameter group and a physical channel is a one-to-all correspondence.

At the same time, in the scheduling method of the specific embodiment of the present disclosure, the resource allocation set is used to independently configure transmission parameter groups for some or all physical channels. Therefore, the method can be applied to scheduling at the mini-slot level, and has better adaptability compared with the existing multi-TTI scheduling solution of the 5G system in which scheduling can only be performed in a unit of slot. When the resource allocation set is used to determine transmission parameters of multiple physical channels, the network device can use one piece of indication information in the DCI, so that the terminal can determine the resource allocation set according to the indication information, and determine transmission parameters of multiple physical channels according to configuration corresponding to the resource allocation set, reducing signaling overheads.

In the scheduling method of some embodiments of the present disclosure, downlink control information DCI for scheduling N physical channels is sent, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, the dedicated transmission parameter group is only used to determine a transmission parameter of a corresponding physical channel, and N is an integer greater than or equal to 1. In this way, the network device can determine transmission parameters of one or more physical channels by setting the resource allocation set, and flexibly adjust the number of determined physical channels and transmission parameters of the physical channels.

Optionally, at least one of the N physical channels is mapped to a mini-slot. In other words, the method of the specific embodiment of the present disclosure can be applied to scheduling at the mini-slot level.

Figure 1A:
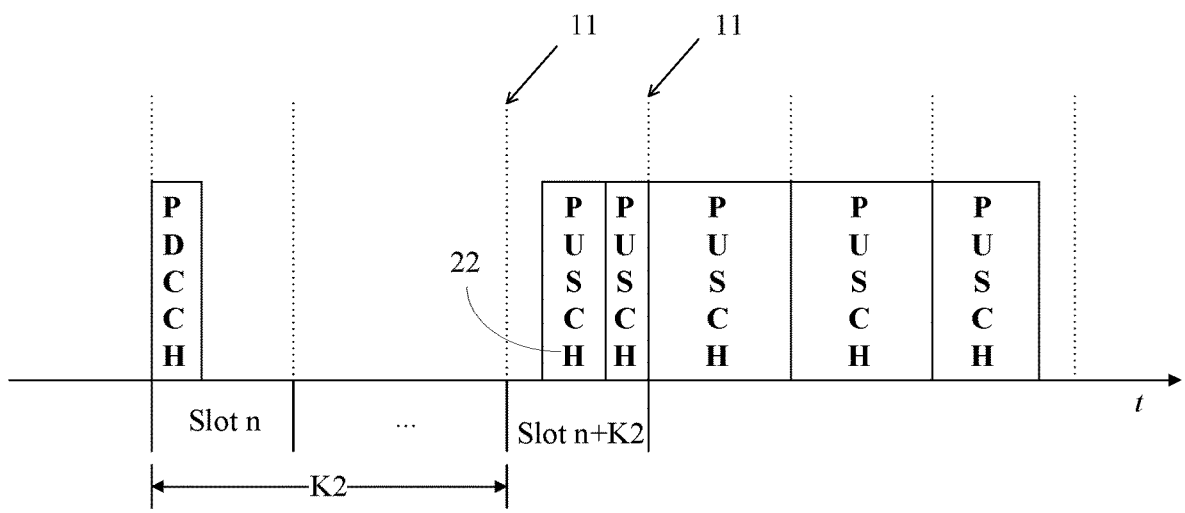
FIG. 1a is a schematic diagram of time domain resource assignment in uplink multi-TTI scheduling.

Mini-slot refers to the division of a symbol set available in a slot into multiple consecutive subsets, and each subset can be mapped to a physical channel, which increases the flexibility of scheduling. As shown in FIG. 1a, FIG. 1a is a schematic diagram of time domain resource assignment in uplink multi-TTI scheduling. In the figure, the reference numeral 11 indicates a slot boundary, and the reference numeral 22 indicates a mini-slot. Both a mini-slot and a slot can be mapped to physical channels.

When at least one of the N physical channels is mapped to a mini-slot, the mini-slot corresponds to a physical channel In this case, user equipment (UE) can perform listen before talk LBT) as the mini-slot starts. Therefore, mini-slots can also increase the opportunities and flexibility of LBT, and improve the success rate of data transmission and resource utilization.

According to the distribution of a mini-slot in the allocated time domain resource, the following two situations can be further distinguished:
only the first one or more slots of the scheduled slots can be split into mini-slots; and
all scheduled slots can be split into mini-slots.

The method of the specific embodiment of the present disclosure can be applied to any of the above-mentioned situations.

Optionally, the first indication information is: identifier information of the resource allocation set; or index information of the resource allocation set.

Specifically, each resource allocation set Allocation_Set may include one or more rows of a preconfigured table for recording time domain transmission parameters, and a row in the table is used to determine a transmission parameter of a physical channel. Multiple resource allocation sets can form a resource allocation set table Allocation_Set_Table including one or more resource allocation sets, and a resource allocation set is represented by an index of the resource allocation set in the resource allocation set table. At the same time, a unique resource allocation set identifier may be set for each resource allocation set in the resource allocation set table, and the resource allocation set is indicated by the resource allocation set identifier.

When the first indication information is identifier information of the resource allocation set, Allocation_Set is identified by a unique ID without considering a relative position of Allocation_Set in Allocation_Set_Table, which facilitates semi-static adjustment (addition or deletion) of some Allocation_Sets in the Allocation_Set_Table. When an Allocation_Set in Allocation_Set_Table is added or deleted, IDs of other Allocation_Sets are not affected.

In a specific embodiment of the present disclosure, the resource allocation set is used to determine the transmission parameters of the N physical channels. The resource allocation set has a restrictive condition, that is, configuration of the resource allocation set includes a dedicated transmission parameter group corresponding to a physical channel, and the dedicated transmission parameter group is only used to determine a transmission parameter of a corresponding physical channel.

The implementation of the resource allocation set is described in further detail below.

Implementation 1: The resource allocation set is configured based on an NR time domain resource assignment table.

Transmission parameters of physical channels scheduled by the network device are all determined based on a row (each row lists the following parameters: K2, S, L (or SLIV), and a mapping type) in a table predefined or preconfigured in NR, and a row (Allocation_Index) in the table can be indicated by a row index of the table.

In implementation 1, the resource allocation set corresponds to at least N first transmission parameter groups.

The at least N first transmission parameter groups include N first transmission parameter groups in a one-to-one correspondence with the N physical channels, and each of the first transmission parameter groups includes an offset parameter and a position parameter.

The offset parameter is used to indicate a slot offset between a slot of a corresponding physical channel and a slot of the DCI.

The position parameter is used to indicate a time domain position of a corresponding physical channel in a slot.

In a specific embodiment of the present disclosure, the resource allocation set corresponds to at least N first transmission parameter groups, and it can also be understood as that the resource allocation set is used to configure at least N first transmission parameter groups.

This configuration can be direct configuration or indirect configuration, for example, N Allocation_Indexes are configured for the resource allocation set, and each Allocation_Index indicates a first transmission parameter group.

Specifically, the offset parameter can be understood as K2, and the position parameter can be understood as SLIV or S and L. A slot of a physical channel can be determined according to the offset parameter, and a time domain position of the physical channel in a slot can be determined according to the position parameter.

That is, in implementation 1, each first transmission parameter group is a dedicated transmission parameter group.

In the following, for example, the physical channel is a PUSCH, and the case in which the first indication information is index information of the resource allocation set is described in detail.

The base station (that is, a network device) preconfigures one or more Allocation_Sets (that is, resource allocation sets) for UE (that is, a terminal) to form an Allocation_Set_Table (that is, a resource allocation set table), each Allocation_Set includes one or more Allocation_Indexes, each Allocation_Index corresponds to a single PUSCH (besides, the chronological order between corresponding PUSCHs depends on the order of Allocation_Indexes in Allocation_Set), and the maximum number of Allocation_Indexes that can be included in a single Allocation_Set can be defined by the protocol, for example, limited to 4 or 8.

The resource allocation set may include (corresponds to or is configured with) one or more rows of a preconfigured table, and a row in the table is used to determine a transmission parameter of a physical channel. The resource allocation set table includes one or more resource allocation sets, and a row index of a resource allocation set in the resource allocation set table can be used as index information of the resource allocation set.

The following condition can be set for Allocation_Set:

It is required that S and L (or SLIV) indicated by two adjacent Allocation_Indexes in the same Allocation_Set have no conflict, that is, one of the following two conditions is met: the former Allocation_Index 1 corresponds to S1 and L1, and the latter Allocation_Index2 corresponds to S2 and L2, and the number of symbols in each slot is Symbol_Num; and for any Allocation_Index, it is required that $S+L-1<Symbol\_Num$, that is, a single PUSCH does not cross the slot boundary.

At the same time, it is also necessary to ensure that time domain transmission resources of different physical channels determined according to transmission parameters do not overlap.

When a gap between adjacent PUSCHs is allowed, one of the following conditions needs to be met:

K2 indicates a slot corresponding to each Allocation_Index (PUSCH). If Allocation_Index 1 and Allocation_Index 2 correspond to the same slot ($K_{2,1}=K_{2,2}$), it is required that S1+L1<=S2, and when S1+L1<S2, there is a gap between two PUSCHs. If Allocation_Index 1 and Allocation_Index 2 correspond to different slots, it is required that $K_{2,1}<K_{2,2}$, and there is no restriction on the length of the gap.

Only the first Allocation_Index in the current Allocation_Set provides a valid K2 value, that is, it indicates a start slot of the entire PUSCH Burst (that is, N scheduled PUSCHs). A K2 value of another Allocation_Index is required to be the same as the K2 value of the first Allocation_Index, or is invalid and neglected as defined in the protocol. When mod (S1+L1, Symbol_Num)!=S2, it means that there is a gap between the two PUSCHs, and the gap length is less than the length of a single slot (otherwise, there is ambiguity when only S and L indicate time domain allocation, and a relationship between indexes of slots of these two PUSCHs cannot be accurately determined). When mod (S1+L1, Symbol_Num)<=S2, it means that Allocation_Index 1 and Allocation_Index 2 correspond to the same slot. When mod (S1+L1, Symbol_Num)>S2, it means that Allocation_Index 2 corresponds to a next slot of a slot corresponding to Allocation_Index 1.

When it is required that there is no gap between adjacent PUSCHs, one of the following conditions needs to be met:

K2 indicates a slot corresponding to each Allocation_Index (a physical channel). If Allocation_Index 1 and Allocation_Index 2 correspond to the same slot ($K_{2,1}=K_{2,2}$), it is required that S1+L1=S2. If Allocation_Index 1 and Allocation_Index 2 correspond to different slots, it is required that $K_{2,1}+1<K_{2,2}$, S1+L1−1=Symbol_Num−1, and S2=0, that is, the previous PUSCH ends at the last symbol in the end of the slot, and the next PUSCH starts at the first symbol in the head of the slot.

Only the first Allocation_Index in the current Allocation_Set provides a valid K2 value, that is, it indicates a start slot of the entire PUSCH Burst. A K2 value of another Allocation_Index is required to be the same as the K2 value of the first Allocation_Index, or is invalid and neglected as defined in the protocol. Besides, it is required that mod (S1+L1, Symbol_Num)=S2, that is, symbols occupied by two adjacent PUSCHs are continuous.

During scheduling, the base station indicates the configured Allocation_Set by scheduling the time domain resource assignment field (corresponding to the "time domain resource assignment" field in NR) in DCI, that is, the first indication information is transmitted in the time domain resource assignment field. For example, if a value of the time domain resource assignment field is m, used Allocation_Set=Allocation_Set_Table (m+1), that is, Allocation_Set in the (m+1)th row of Allocation_Set_Table is used. The time domain resource assignment field starts from 0, and a row index of Allocation_Set_Table starts from 1.

The number of bits in the time domain resource assignment field can be set to ceiling (log 2 (Allocation_Set_Num)), where ceiling 0 is the rounding up operation, and Allocation_Set_Num is the number of Allocation_Sets included in Allocation_Set_Table.

The base station indicates the number of PUSCHs scheduled by the DCI, and the following methods can be used:

After determining the Allocation_Set based on the time domain resource assignment field in the DCI, the base station can determine, according to the number of Allocation_Indexes included in the Allocation_Set, the number of PUSCHs (that is, PUSCH_Num) simultaneously scheduled by the DCI. The value of PUSCH_Num is the same as the number of PUSCHs in Allocation_Set determined based on the time domain resource assignment field, and there is no need to use other indication information to indicate the number of PUSCHs scheduled by the DCI.

The base station can use a separate field in the DCI to indicate the number of actually scheduled PUSCHs, that is, PUSCH_Num. That is, the DCI further includes second indication information for indicating the value of N. PUSCH_Num needs to meet at least one of the following conditions:

The value of PUSCH_Num is the same as the number of PUSCHs in Allocation_Set determined based on the time domain resource assignment field.

The value of PUSCH_Num is less than or equal to the number of PUSCHs in Allocation_Set determined based on the time domain resource assignment field. When the value of PUSCH_Num is less than the number of PUSCHs in Allocation_Set determined based on the time domain resource assignment field, the first PUSCH_Num Allocation_Indexes are obtained from determined Allocation_Set, to determine the transmission attribute of each scheduled PUSCH.

For example, if PUSCH_Num is 2 and the number of PUSCHs in Allocation_Set is 4, transmission parameters of PUSCHs actually scheduled by the network device are determined based on transmission parameters corresponding to the first and second Allocation_Indexes configured in Allocation_Set.

In implementation 1, in addition to the index information of the resource allocation set in the resource allocation set table, the identifier information of the resource allocation set may be used as the first indication information.

Unique identifier information (ID) is set for each Allocation_Set, and an ID is used to indicate applied Allocation_Set in the time domain resource assignment field in the DCI.

For each Allocation_Set, in addition to configuring one or more Allocation_Indexes, a unique ID is also configured to identify the Allocation_Set.

During scheduling, the base station determines, based on the identifier information of the resource allocation set of the DCI, the Allocation_Set corresponding to the ID in the Allocation_Set_Table. For example, if the value of the time domain resource assignment field (the ID is transmitted in the time domain resource assignment field) is m, Allocation_Set whose ID is m is used. The number of bits in the time domain resource assignment field can be set to ceiling (log 2 (Max_Allocation_Set_ID+1)), where ceiling ( ) is a rounding up operation, Max_Allocation_Set_ID is the maximum value of the ID of Allocation_Set, and the ID of Allocation_Set can be numbered from 0.

The base station indicates the number of PUSCHs scheduled by the DCI, and the following methods can be used:

After determining the Allocation_Set based on the time domain resource assignment field in the DCI, the base station can determine, according to the number of Allocation_Indexes included in the Allocation_Set, the number of PUSCHs (that is, PUSCH_Num) simultaneously scheduled by the DCI. The value of PUSCH_Num is the same as the number of PUSCHs in Allocation_Set determined based on the time domain resource assignment field, and there is no need to use other indication information to indicate the number of PUSCHs scheduled by the DCI.

The base station can use a separate field in the DCI to indicate the number of actually scheduled PUSCHs, that is, PUSCH_Num. That is, the DCI further includes second indication information for indicating the value of N. PUSCH_Num needs to meet at least one of the following conditions:

The value of PUSCH_Num is the same as the number of PUSCHs in Allocation_Set determined based on the time domain resource assignment field.

The value of PUSCH_Num is less than or equal to the number of PUSCHs in Allocation_Set determined based on the time domain resource assignment field. When the value of PUSCH_Num is less than the number of PUSCHs in Allocation_Set determined based on the time domain resource assignment field, the first PUSCH_Num Allocation_Indexes are obtained from determined Allocation_Set, to determine the transmission attribute of each scheduled PUSCH.

For example, if PUSCH_Num is 2 and the number of PUSCHs in Allocation_Set is 4, transmission parameters of PUSCHs actually scheduled by the network device are determined based on transmission parameters corresponding to the first and second Allocation_Indexes configured in Allocation_Set.

When the first indication information is identifier information of the resource allocation set, Allocation_Set is identified by a unique ID without considering a relative position of Allocation_Set in Allocation_Set_Table, which facilitates semi-static adjustment (addition or deletion) of some Allocation_Sets in the Allocation_Set_Table. When an Allocation_Set in Allocation_Set_Table is added or deleted, IDs of other Allocation_Sets are not affected.

Implementation 2: The resource allocation set is configured based on a newly defined time domain resource assignment table.

In the newly defined table, the transmission parameter of the physical channel can be determined in a simpler manner to optimize signaling load.

In implementation 1, each of the first transmission parameter groups includes an offset parameter and a position parameter. However, the offset parameter does not need to be configured separately for each Allocation_Index, and can be configured for each Allocation_Set.

Moreover, when multiple physical channels are continuous in the time domain, if the start point of the first physical channel can be determined, a transmission parameter group corresponding to each physical channel only needs to be configured with a length, to determine all transmission parameters of the physical channels.

Based on the foregoing two aspects, in implementation 2, the resource allocation set corresponds to a third transmission parameter group and at least N fourth transmission parameter groups (it may also be understood as that the resource allocation set is configured with the third transmission parameter group and the at least N fourth transmission parameter groups); or corresponds to a fifth transmission parameter group and at least N sixth transmission parameter groups;

the third transmission parameter group includes: an offset parameter and a start parameter;

the at least N fourth transmission parameter groups include N fourth transmission parameter groups in a one-to-one correspondence with the N physical channels, and each of the fourth transmission parameter groups includes a length parameter;

the fifth transmission parameter group includes: an offset parameter;

the at least N sixth transmission parameter groups include N sixth transmission parameter groups in a one-to-one correspondence with the N physical channels, and each of the sixth transmission parameter groups includes a start parameter and a length parameter;

the offset parameter is used to indicate a slot offset between a slot of the first physical channel of the N physical channels and a slot of the DCI;

the start parameter is used to indicate a start symbol of the first physical channel of the N physical channels in a slot; and the length parameter is used to indicate the number of consecutive symbols occupied by a corresponding physical channel.

In the above solution, the case in which the resource allocation set corresponds to the third transmission parameter group and the at least N fourth transmission parameter groups can be applied to a case in which physical channels are continuous in the time domain, and the other configuration can be applied to all cases in which physical channels are continuous or discontinuous in the time domain.

In the above case, each of the fourth transmission parameter group and the sixth transmission parameter group is a dedicated transmission parameter group.

The following provides descriptions in detail.

A transmission parameter of each physical channel scheduled by the network device is determined according to a row in the newly defined table. Allocation_Index is a row index of the table. Allocation_Index can be used to indicate a row in the newly defined table.

A row in the newly defined table includes one or more of the following parameters:

Start symbol S, where this parameter can be optionally included. When this parameter is not included, the start symbol First_S of the first PUSCH needs to be indicated in Allocation_Set. Symbol positions occupied by other PUSCHs are deduced based on the number of symbols occupied by the PUSCHs and the symbol position occupied by the first PUSCH. In this case, it is required that there is no gap between adjacent PUSCHs.

When there is a gap between adjacent PUSCHs, the start symbol S needs to be included.

The number L of allocated consecutive symbols (that is, the length parameter), indicating the number of consecutive symbols occupied by the corresponding physical channel. This parameter must be included.

A mapping type, where this parameter can be optionally included. When this parameter is not included, a PUSCH DM-RS mapping type can be determined based on a predefined rule. For example, only when the PUSCH occupies the first symbol of the slot and the number of allocated consecutive symbols>=4, Type A is used. Type B is used in other cases. The newly defined table can be clearly defined in the specification, or can be preconfigured by the base station for the UE.

The base station preconfigures one or more Allocation_Sets for the UE to form Allocation_Set_Table, and configures the following parameters for each Allocation_Set:

One or more Allocation_Indexes, where each Allocation_Index corresponds to a single PUSCH (besides, the chronological order between corresponding PUSCHs depends on the order of Allocation_Indexes in Allocation_Set), and the maximum number of Allocation_Indexes that can be included in a single Allocation_Set can be defined by the protocol, for example, limited to 4 or 8. This Allocation_Index sequence must be included.

Slot offset K2, indicating an offset of a slot n_PUSCH of the first PUSCH relative to a slot n of DCI, where n_PUSCH=n+K2. This parameter must be included.

The start symbol First_S of the first PUSCH. If the start symbol S is not configured for each Allocation_Index, this parameter is configured, that is, the start symbol First_S of the first PUSCH is configured.

When the start symbol S is configured for an Allocation_Index, it is required that S and L indicated by two adjacent Allocation_Indexes in the same Allocation_Set have no conflict, that is, time domain transmission resources of different physical channels determined according to transmission parameters do not overlap. One of the following two conditions needs to be met (assuming that the former Allocation_Index 1 corresponds to S1 and L1, and the latter Allocation_Index 2 corresponds to S2 and L2, and the number of symbols in each slot is Symbol_Num; and for any Allocation_Index, it is required that S+L−1<Symbol_Num, that is, a single PUSCH does not cross the slot boundary):

Case 1: When a gap between adjacent PUSCHs is allowed, one of the following conditions needs to be met:

When mod (S1+L1, Symbol_Num)!=S2, it means that there is a gap between the two PUSCHs, and the gap length is less than the length of a single slot (otherwise, there is ambiguity when only S and L indicate time domain allocation, and a relationship between indexes of slots of these two PUSCHs cannot be accurately determined). When mod (S1+L1, Symbol_Num)<=S2, it means that Allocation_Index 1 and Allocation_Index 2 correspond to the same slot. When mod (S1+L1, Symbol_Num)>S2, it means that Allocation_Index 2 corresponds to a next slot of a slot corresponding to Allocation_Index 1.

Case 2: When it is required that there is no gap between adjacent PUSCHs, one of the following conditions needs to be met:

mod (S1+L1, Symbol_Num)=S2, that is, symbols occupied by two adjacent PUSCHs are continuous.

When First_S is configured for Allocation_Set, the Allocation_Index corresponding to each PUSCH is not configured with the start symbol S, the allocated PUSCH is continuous in the time domain, there is no gap between adjacent PUSCHs, and a next symbol of an end symbol of a previous PUSCH is the first symbol of a next PUSCH. In this case, it is required that symbols occupied by each PUSCH allocated in the same Allocation_Set cannot cross the slot boundary. That is, it is assumed that a PUSCH corresponding to a former Allocation_Index 1 of two adjacent Allocation_Indexes in this Allocation_Set ends at symbol E1, the number of consecutive symbols occupied by a PUSCH corresponding to the latter Allocation_Index 2 is L2, and the number of symbols in each slot is Symbol_Num. In this case, it is required that mod (E1+1, Symbol_Num)+L2<=Symbol_Num.

During scheduling, the base station indicates Allocation_Set in a configured Allocation_Set_Table by scheduling the time domain resource assignment field (corresponding to the "time domain resource assignment" field in NR) in DCI. For example, if the value of the time domain resource assignment field is m, used Allocation_Set=Allocation_Set_Table (m+1). The number of bits in the time domain resource assignment field can be set to ceiling (log 2 (Allocation_Set_Num)), where ceiling ( ) is a rounding up operation, and Allocation_Set_Num is the number of Allocation_Sets included in Allocation_Set_Table.

The base station indicates the number of PUSCHs scheduled by the DCI, and the following methods can be used:

After determining the Allocation_Set based on the time domain resource assignment field in the DCI, the base station can determine, according to the number of Allocation_Indexes included in the Allocation_Set, the number of PUSCHs (that is, PUSCH_Num) simultaneously scheduled by the DCI. The value of PUSCH_Num is the same as the number of PUSCHs in Allocation_Set determined based on the time domain resource assignment field, and there is no need to use other indication information to indicate the number of PUSCHs scheduled by the DCI.

The base station can use a separate field in the DCI to indicate the number of actually scheduled PUSCHs, that is, PUSCH_Num. That is, the DCI further includes second indication information for indicating the value of N. PUSCH_Num needs to meet at least one of the following conditions:

The value of PUSCH_Num is the same as the number of PUSCHs in Allocation_Set determined based on the time domain resource assignment field.

The value of PUSCH_Num is less than or equal to the number of PUSCHs in Allocation_Set determined based on the time domain resource assignment field. When the value of PUSCH_Num is less than the number of PUSCHs in Allocation_Set determined based on the time domain resource assignment field, the first PUSCH_Num Allocation_Indexes are obtained from determined Allocation_Set, to determine the transmission attribute of each scheduled PUSCH.

For example, if PUSCH_Num is 2 and the number of PUSCHs in Allocation_Set is 4, transmission parameters of PUSCHs actually scheduled by the network device are determined based on transmission parameters corresponding to the first and second Allocation_Indexes configured in Allocation_Set.

In implementation 2, the first indication information may be further the identifier information of the resource allocation set.

A unique ID is set for each Allocation_Set, and an ID is used to indicate applied Allocation_Set in the time domain resource assignment field in the DCI.

For each Allocation_Set, in addition to the foregoing multiple parameters, a unique ID is also configured to identify the Allocation_Set.

During scheduling, the base station indicates an ID of an Allocation_Set in a configured Allocation_Set_Table by scheduling the time domain resource assignment field in DCI. For example, if the value of the time domain resource assignment field is m, Allocation_Set whose ID is m is used. The number of bits in the time domain resource assignment field can be set to ceiling (log 2 (Max_Allocation_Set_ID+1)), where ceiling 0 is a rounding up operation, Max_Allocation_Set_ID is the maximum value of the ID of Allocation_Set, and the ID of Allocation_Set can be numbered from 0.

The base station indicates the number of PUSCHs scheduled by the DCI, and the following methods can be used: After determining the Allocation_Set based on the time domain resource assignment field in the DCI, the base station can determine, according to the number of Allocation_Indexes included in the Allocation_Set, the number of PUSCHs (that is, PUSCH_Num) simultaneously scheduled by the DCI. The value of PUSCH_Num is the same as the number of PUSCHs in Allocation_Set determined based on the time domain resource assignment field, and there is no need to use other indication information to indicate the number of PUSCHs scheduled by the DCI.

The base station can use a separate field in the DCI to indicate the number of actually scheduled PUSCHs, that is, PUSCH_Num. That is, the DCI further includes second indication information for indicating the value of N. PUSCH_Num needs to meet at least one of the following conditions:

The value of PUSCH_Num is the same as the number of PUSCHs in Allocation_Set determined based on the time domain resource assignment field.

The value of PUSCH_Num is less than or equal to the number of PUSCHs in Allocation_Set determined based on the time domain resource assignment field. When the value of PUSCH_Num is less than the number of PUSCHs in Allocation_Set determined based on the time domain resource assignment field, the first PUSCH_Num Allocation_Indexes are obtained from determined Allocation_Set, to determine the transmission attribute of each scheduled PUSCH.

For example, if PUSCH_Num is 2 and the number of PUSCHs in Allocation_Set is 4, transmission parameters of PUSCHs actually scheduled by the network device are determined based on transmission parameters corresponding to the first and second Allocation_Indexes configured in Allocation_Set.

Implementation 1 is based on the transmission parameter included in the table predefined or preconfigured in the NR, and implementation 2 is based on the transmission parameter included in the newly defined table.

Implementation 3 combines implementation 1 and implementation 2.

In implementation 3, a transmission parameter of the physical channel mapped to the scheduled first slot or mini-slot is determined based on a row in the table predefined or preconfigured in NR, and parameters such as K2 do not need to be indicated for other slots or mini-slots. Then, it may be considered that the transmission parameter of the physical channel is determined based on a newly defined more concise table, to optimize signaling load.

In implementation 1, each of the first transmission parameter groups includes an offset parameter and a position parameter. However, the offset parameter does not need to be configured separately for each Allocation_Index, and can be configured for each Allocation_Set.

Moreover, when multiple physical channels are continuous in the time domain, if the start point of the first physical channel can be determined, a transmission parameter group corresponding to each physical channel only needs to be configured with a length, to determine all transmission parameters of the physical channels.

It can be found that a transmission parameter that is not of the first physical channel is partially related to the transmission parameters of the first physical channel. Therefore, in implementation 3, the transmission parameter of the first physical channel is completely transmitted, while the transmission parameter groups of other physical channels do not include the transmission parameter of the first physical channel that can be multiplexed, such as K2, for another example, the start parameter of the first physical channel when channels are continuous.

In this case, the resource allocation set corresponds to at least N−1 second transmission parameter groups;

the at least N−1 second transmission parameter groups include N−1 second transmission parameter groups in a one-to-one correspondence with physical channels of the N physical channels other than the first physical channel, and each of the second transmission parameter groups includes a length parameter or includes a start parameter and a length parameter;

the start parameter is used to indicate a start symbol of a corresponding physical channel in a slot; and the length parameter is used to indicate the number of consecutive symbols occupied by a corresponding physical channel.

The DCI further includes third indication information, and the third indication information is used to indicate a target transmission parameter group of the first physical channel of the N physical channels.

In implementation 3, the second transmission parameter group is a dedicated transmission parameter group.

When the physical channels are continuously distributed, each of the second transmission parameter groups may include a length parameter. However, when the physical channels are discontinuously distributed, each of the second transmission parameter groups includes a start parameter and a length parameter.

Specifically, the network device indicates the target transmission parameter group of the first physical channel of the N physical channels in the third indication information, and the third indication information may be identifier information of the target transmission parameter group; or the third indication information may be index information of the target transmission parameter group. The network device determines transmission parameters of physical channels of the N physical channels other than the first physical channel based on the resource allocation set.

A transmission parameter of the scheduled first slot or mini-slot is determined based on a row (each row lists the following parameters: K2, S, L (or SLIV), and a mapping type) in a table predefined or preconfigured in NR. Allocation_Index_NR is a row index of the table. Allocation_Index_NR indicates a row in the table, and the target transmission parameter group can be determined according to a row in the table predefined or preconfigured in NR.

A transmission parameter of a slot or a mini-slot of scheduled slots or mini-slots other than the first slot or mini-slot is determined based on a row in a newly defined table. Assuming that a row is indicated by Allocation_Index_New, Allocation_Index_New is a row index of the table, and this row includes one or more of the following parameters:

a start symbol S, where this parameter can be optionally included;

the number L of allocated consecutive symbols, where this parameter must be included; and a mapping type, where this parameter can be optionally included, when this parameter is not included, a PUSCH DM-RS mapping type can be determined based on a predefined rule, for example, only when the PUSCH occupies the first symbol of the slot and the number of allocated consecutive symbols>=4, Type A is used, and type B is used in other cases.

The newly defined table can be clearly defined in the specification, or can be preconfigured by the base station for the UE.

Refer to related operations in NR. A time domain resource assignment table is predefined in the protocol, or semi-statically configured by the base station for the UE via Radio Resource Control (Radio Resource Control, RRC for short) signaling. The structure and the configuration method of this table are specified in the NR protocol. The table can be configured for uplink single-TTI (that is, Single-TTI) scheduling and uplink multi-TTI (that is, Multi-TTI) scheduling, or can be used only by uplink multi-TTI scheduling. Then, the base station preconfigures one or more Allocation_Sets for UE to form an Allocation_Set_Table, each Allocation_Set includes zero or more Allocation_Index_New (when each Allocation_Set includes zero Allocation_Index_New, it indicates that DCI only schedules a single PUSCH transmission), each Allocation_Index_New corresponds to a single PUSCH (besides, the chronological order between corresponding PUSCHs depends on the order of Allocation_Index_New in Allocation_Set), and the maximum number of Allocation_Index_New that can be included in a single Allocation_Set can be defined by the protocol, for example, limited to 3 (that is, 4−1) or 7 (that is, 8−1).

When the start symbol S is configured for Allocation_Index_New, it is required that S and L indicated by two adjacent Allocation_Index_New in the same Allocation_Set, S and L indicated by the valid Allocation_Index_NR in the NR time domain resource assignment table, and S and L indicated by the first Allocation_Index_New in the valid Allocation_Set in the Allocation_Set_Table have no conflict. That is, time domain transmission resources of different physical channels determined according to the transmission parameters do not overlap. One of the following two conditions is met (assuming that the former Allocation_Index_New1 or Allocation_Index_NR corresponds to S1 and L1, and the latter Allocation_Index_New2 corresponds to S2 and L2, and the number of symbols in each slot is Symbol_Num; for any Allocation_Index_New or Allocation_Index_NR, it is required that S+L−1<Symbol_Num, that is, a single PUSCH does not cross the slot boundary):

Case 1: When a gap between adjacent PUSCHs is allowed, one of the following conditions needs to be met:

When mod (S1+L1, Symbol_Num)!=S2, it means that there is a gap between the two PUSCHs, and the gap length is less than the length of a single slot (otherwise, there is ambiguity when only S and L indicate time domain allocation, and a relationship between indexes of slots of these two PUSCHs cannot be accurately determined). When mod (S1+L1, Symbol_Num)<=S2, it means that Allocation_Index_New1 (or Allocation_Index_NR) and Allocation_Index_New2 correspond to the same slot. When mod (S1+L1, Symbol_Num)>S2, it means that Allocation_Index_New2 corresponds to a next slot of a slot corresponding to Allocation_Index_New1 (or Allocation_Index_NR).

Case 2: When it is required that there is no gap between adjacent PUSCHs, one of the following conditions needs to be met:

mod (S1+L1, Symbol_Num)=S2, that is, symbols occupied by two adjacent PUSCHs are continuous.

When the start symbol S is not configured for an Allocation_Index_New, and a valid Allocation_Index_NR indication in the NR time domain resource assignment table is determined, the allocated PUSCH is continuous in the time domain, there is no gap between adjacent PUSCHs, and a next symbol of an end symbol of a previous PUSCH is the first symbol of a next PUSCH. In this case, it is required that symbols occupied by each PUSCH allocated in the same Allocation_Set cannot cross the slot boundary. That is, it is assumed that a PUSCH corresponding to a former Allocation_Index_New 1 of two adjacent Allocation_Index_New in this Allocation_Set ends at symbol E1, the number of consecutive symbols occupied by a PUSCH corresponding to the latter Allocation_Index_New2 is L2, and the number of symbols in each slot is Symbol_Num. In this case, it is required that mod (E1+1, Symbol_Num)+L2<=Symbol_Num.

During scheduling, the base station indicates a row in the configured NR time domain resource assignment table by scheduling the time domain resource assignment field (corresponding to the "time domain resource assignment" field in NR) in DCI. For example, if the value of the time domain resource assignment field is m, the transmission attribute of an $(m+1)^{th}$ row in the NR time domain resource assignment table is applied to a PUSCH mapped to the first slot or mini-slot of the multiple slots or mini-slots scheduled by the DCI. A transmission attribute of a PUSCH mapped to a slot or mini-slot other than the first slot or mini-slot can be determined in one of the following two methods:

The base station newly introduces an additional time domain resource assignment 2 field in the scheduling DCI (for example, a "Time domain resource assignment 2" field is added to the DCI) to indicate an Allocation_Set in Allocation_Set_Table. That is, assuming that the value of the time domain resource assignment 2 field is m2, used Allocation_Set=Allocation_Set_Table (m2+1). The number of bits in the time domain resource assignment 2 field can be set to ceiling (log 2 (Allocation_Set_Num)), where ceiling 0 is the rounding up operation, and Allocation_Set_Num is the number of Allocation_Sets included in Allocation_Set_Table.

The base station still uses the time domain resource assignment field in the scheduling DCI (corresponding to the "Time domain resource assignment" field in NR) to indicate an Allocation_Set in Allocation_Set_Table. That is, assuming that the value of the time domain resource assignment field is m, used Allocation_Set=Allocation_Set_Table (m+1). The number of Allocation_Set in Allocation_Set_Table>=the number of rows in the NR time domain resource assignment table. Generally, the two can be equal.

The base station indicates the number of PUSCHs scheduled by the DCI, and the following method is used:

After determining the Allocation_Set based on the time domain resource assignment field or the time domain resource assignment 2 field in the DCI, the base station can determine, according to the number of Allocation_Index_New included in the Allocation_Set, PUSCH_Num (that is, PUSCH_Num=the number of PUSCHs in Allocation_Set determined based on the time domain resource assignment field or the time domain resource assignment 2 field+1) simultaneously scheduled by the DCI. There is no need to use other indication information. 1 herein corresponds to the first scheduled PUSCH whose transmission parameter is specified by a specified row in the NR time domain resource assignment table.

The base station can use a separate field in the DCI to indicate the number of actually scheduled PUSCHs, that is, PUSCH_Num. PUSCH_Num needs to satisfy one of the following conditions:

PUSCH_Num=the number of PUSCHs in Allocation_Set determined based on the time domain resource assignment field or the time domain resource assignment 2 field+1.

PUSCH_Num is less than or equal to the number of PUSCHs in Allocation_Set determined based on the time domain resource assignment field or the time domain resource assignment 2 field+1. When PUSCH_Num is less than the number of PUSCHs in Allocation_Set+1, the first (PUSCH_Num−1) Allocation_Index_New are obtained from determined Allocation_Set, to determine the transmission attribute of each scheduled PUSCH other than the first scheduled PUSCH.

In implementation 3, the first indication information may be further the identifier information of the resource allocation set.

A unique ID is set for each Allocation_Set, and an ID is used to indicate applied Allocation_Set in the time domain resource assignment field or the time domain resource assignment 2 field in the DCI. That is, the first indication information may be transmitted in a time domain resource assignment field, or the first indication information may be transmitted in a time domain resource assignment 2 field added to DCI.

For each Allocation_Set, in addition to configuring one or more Allocation_Index_New, a unique ID is also configured to identify the Allocation_Set.

During scheduling, the base station indicates an ID of an Allocation_Set in a configured Allocation_Set_Table by scheduling the time domain resource assignment field or the time domain resource assignment 2 field in DCI. That is, assuming that the value of the time domain resource assignment field/the time domain resource assignment 2 field is m, Allocation_Set whose ID is m is used. When the additional time domain resource assignment 2 field is newly introduced in the scheduling DCI, the number of bits in the time domain resource assignment 2 field can be set to ceiling (log 2 (Max_Allocation_Set_ID+1)), where ceiling 0 is a rounding up operation, Max_Allocation_Set_ID is the maximum value of the ID of Allocation_Set, and the ID of Allocation_Set can be numbered from 0. That is, the number of bits in the time domain resource assignment field or the time domain resource assignment 2 field is a value obtained by rounding up log 2 (X), and X is the number of preconfigured resource allocation sets, or X is the maximum value of a resource allocation set identifier+1.

The base station indicates the number of PUSCHs scheduled by the DCI, and the following method is used:

After determining the Allocation_Set based on the time domain resource assignment field or the time domain resource assignment 2 field in the DCI, the base station can determine, according to the number of Allocation_Index_New included in the Allocation_Set, PUSCH_Num (that is, PUSCH_Num=the number of PUSCHs in Allocation_Set determined based on the time domain resource assignment field or the time domain resource assignment 2 field+1) simultaneously scheduled by the DCI. There is no need to use other indication information.

The base station can use a separate field in the DCI to indicate the number of actually scheduled PUSCHs, that is, PUSCH_Num. PUSCH_Num needs to satisfy at least one of the following conditions:

PUSCH_Num=(the number of PUSCHs in Allocation_Set determined based on the time domain resource assignment field or the time domain resource assignment 2 field)+1.

PUSCH_Num≤(the number of PUSCHs in Allocation_Set determined based on the time domain resource assignment field or the time domain resource assignment 2 field)+1. When PUSCH_Num is less than the number of PUSCHs in Allocation_Set+1, the first (PUSCH_Num−1) Allocation_Index_New are obtained from determined Allocation_Set, to determine the transmission attribute of each scheduled PUSCH other than the first scheduled PUSCH.

In a specific embodiment of the present disclosure, the mapping type parameter may be configured explicitly or determined implicitly.

When the mapping type parameter is configured explicitly, the first transmission parameter group, the second transmission parameter group, the fourth transmission parameter group, or the sixth transmission parameter group further includes a mapping type parameter, and the mapping type parameter is used to indicate a mapping type of a DM-RS corresponding to the physical channel.

Mapping types (Mapping Type) of a demodulation reference signal (Demodulation Reference Signal, DM-RS for short) can include a first type (Type A) and a second type (Type B). Limitation for S and L in these two types is shown in Table 1. Type A requires that the allocated symbols always start from the first symbol of a slot, while Type B basically has no restrictions on the start positions and the number of allocated symbols and the time domain resource assignment is more flexible.

TABLE 1

| PUSCH mapping type | Normal cyclic prefix (Normal cyclic prefix) | | | Extended cyclic prefix (Extended cyclic prefix) | | |
| --- | --- | --- | --- | --- | --- | --- |
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 1} | {1, . . . , 12} | {1, . . . , 12} |

Figure 2:
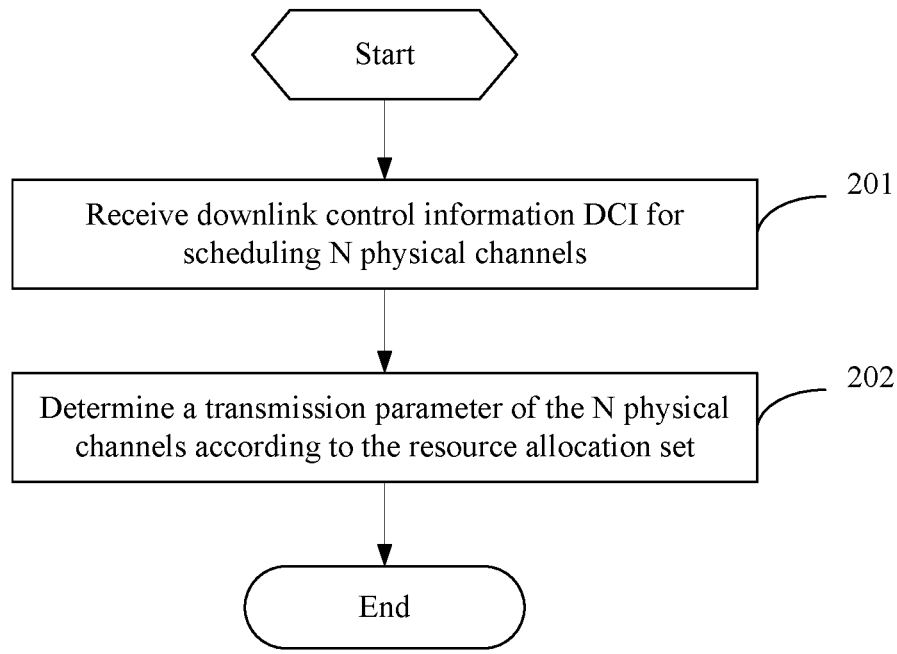
FIG. 2 is a second flowchart of a scheduling method according to some embodiments of the present disclosure.

Referring to FIG. 2, FIG. 2 is a second flowchart of a scheduling method according to some embodiments of the present disclosure. As shown FIG. 2, this embodiment provides a scheduling method, applied to a terminal. The method includes the following steps:

Step 201: Receive downlink control information DCI for scheduling N physical channels, where the DCI includes first indication information, the first indication information is used to indicate a resource allocation set, configuration of the resource allocation set includes a dedicated transmission parameter group corresponding to a physical channel, the dedicated transmission parameter group is only used to determine a transmission parameter of a corresponding physical channel, and N is an integer greater than or equal to 1.

Specifically, the first indication information is used to indicate the resource allocation set, the transmission parameters of the N physical channels may be determined according to the resource allocation set, and N is an integer greater than or equal to 1. The network device can determine transmission parameters of one or more physical channels according to actual requirements by setting the resource allocation set, and flexibly adjust the number of determined physical channels and transmission parameters of the physical channels. The physical channel can be a physical uplink shared channel (Physical Uplink Shared Channel, PUSCH) or a physical downlink shared channel (Physical Downlink Shared Channel, PDSCH).

The meaning of the term "dedicated" in the dedicated transmission parameter group in a specific embodiment of the present disclosure can also be understood as "independent", that is, the transmission parameter group is only used to determine a transmission parameter of a corresponding physical channel, and is not used to determine transmission parameters for other physical channels.

Different from the related technology, in the scheduling method of the specific embodiment of the present disclosure, the resource allocation set needs to be first determined based on the first indication information, and then the transmission parameter of the scheduled physical channel is determined based on the transmission parameter group configured in the resource allocation set.

That is, in the scheduling method of the specific embodiment of the present disclosure, only a resource allocation set needs to be indicated to determine final transmission parameters of all physical channels, which is unlike LTE in which a transmission parameter configuration solution corresponding to each physical channel needs to be indicated. Therefore, this method reduces signaling overheads.

At the same time, in the existing multi-TTI scheduling solution of the 5G system, one configuration solution is also indicated, but a parameter group in the configuration solution is used for all physical channels. In the scheduling method of the specific embodiment of the present disclosure, although one resource allocation set is also indicated, the resource allocation set at least includes a dedicated transmission parameter group corresponding to a physical channel, and the dedicated transmission parameter group is only used to determine a transmission parameter of a corresponding physical channel. This is unlike the existing multi-TTI scheduling solution of the 5G system in which the parameter group in the configuration solution is used to determine transmission parameters of all physical channels.

In other words, the specific embodiment of the present disclosure includes a one-to-one transmission parameter group, that is, a correspondence between a transmission parameter group and a physical channel is a one-to-one correspondence. In the existing multi-TTI scheduling solution of the 5G system, a correspondence between a transmission parameter group and a physical channel is a one-to-all correspondence.

At the same time, in the scheduling method of the specific embodiment of the present disclosure, the resource allocation set is used to independently configure transmission parameter groups for some or all physical channels. Therefore, the method can be applied to scheduling at the mini-slot level, and has better adaptability compared with the existing multi-TTI scheduling solution of the 5G system in which scheduling can only be performed in a unit of slot. When the resource allocation set is used to determine transmission parameters of multiple physical channels, the network device can use one piece of indication information in the DCI, so that the terminal can determine the resource allocation set according to the indication information, and determine transmission parameters of multiple physical channels according to configuration corresponding to the resource allocation set, reducing signaling overheads.

Step 202: Determine transmission parameters of the N physical channels according to the resource allocation set.

The terminal may determine transmission parameters of the N physical channels according to the received resource allocation set. Time domain transmission resources of each physical channel that are determined according to the transmission parameter are located in the same slot; or time domain transmission resources of different physical channels that are determined according to the transmission parameter do not overlap. In other words, the time domain transmission resources of each physical channel determined according to the transmission parameter can be located in the same slot, or there is no gap between the time domain transmission resources of adjacent physical channels, that is, the next symbol of the end symbol of the time domain transmission resource of a previous physical channel is the first symbol of the time domain transmission resource of the next physical channel, or there is a gap between the time domain transmission resources of adjacent physical channels, that is, there is a gap between the end symbol of the time domain transmission resource of the previous physical channel and the first symbol of the time domain transmission resource of the next physical channel.

In the scheduling method in some embodiments of the present disclosure, downlink control information DCI for scheduling N physical channels is received, where the DCI includes first indication information, the first indication information is used to indicate a resource allocation set, configuration of the resource allocation set includes a dedicated transmission parameter group corresponding to a physical channel, the dedicated transmission parameter group is only used to determine a transmission parameter of a corresponding physical channel, and N is an integer greater than or equal to 1. The transmission parameters of the N physical channels are determined according to the resource allocation set. In this way, the terminal can determine transmission parameters of one or more physical channels according to the resource allocation set, and the network device can flexibly adjust the number of allocated physical channels and transmission parameters of the physical channels according to the resource allocation set.

Optionally, at least one of the N physical channels is mapped to a mini-slot (that is, mini-slot). In other words, the method of the specific embodiment of the present disclosure can be applied to scheduling at the mini-slot level.

Optionally, the first indication information is: identifier information of the resource allocation set; or index information of the resource allocation set.

Specifically, each resource allocation set Allocation_Set may include one or more rows of a preconfigured table for recording time domain transmission parameters, and a row in the table is used to determine a transmission parameter of a physical channel. Multiple resource allocation sets can form a resource allocation set table Allocation_Set_Table including one or more resource allocation sets, and a resource allocation set is represented by an index of the resource allocation set in the resource allocation set table. At the same time, a unique resource allocation set identifier may be set for each resource allocation set in the resource allocation set table, and the resource allocation set is indicated by the resource allocation set identifier.

When the first indication information is identifier information of the resource allocation set, Allocation_Set is identified by a unique ID without considering a relative position of Allocation_Set in Allocation_Set_Table, which facilitates semi-static adjustment (addition or deletion) of some Allocation_Sets in the Allocation_Set_Table. When an Allocation_Set in Allocation_Set_Table is added or deleted, IDs of other Allocation_Sets are not affected.

In a specific embodiment of the present disclosure, the resource allocation set is used to determine the transmission parameters of the N physical channels. The resource allocation set has a restrictive condition, that is, configuration of the resource allocation set includes a dedicated transmission parameter group corresponding to a physical channel, and the dedicated transmission parameter group is only used to determine a transmission parameter of a corresponding physical channel.

Optionally, the value of N is determined according to the transmission resource allocation set.

Specifically, the base station indicates the number of PUSCHs scheduled by the DCI, and the following methods can be used:

After determining the Allocation_Set based on the time domain resource assignment field in the DCI, the base station can determine, according to the number of Allocation_Indexes included in the Allocation_Set, the number of PUSCHs (that is, PUSCH_Num) simultaneously scheduled by the DCI. The value of PUSCH_Num is the same as the number of PUSCHs in Allocation_Set determined based on the time domain resource assignment field. In this case, the value of N (that is, the value of PUSCH_Num) is determined according to the transmission resource allocation set (that is, Allocation_Set). There is no need to use other indication information to indicate the number of PUSCHs scheduled by the DCI.

Optionally, the base station can also use a separate field in the DCI to indicate the number of actually scheduled physical channels, that is, the DCI further includes second indication information, used to indicate a value of N, and the determining transmission parameters of the N physical channels according to the resource allocation set specifically includes:

in a case that the number of transmission parameter groups determined according to the transmission resource allocation set is greater than N, selecting the first N transmission parameter groups as transmission parameters of the N physical channels.

Specifically, the base station can use a separate field in the DCI to indicate the number of actually scheduled PUSCHs, that is, PUSCH_Num. PUSCH_Num needs to satisfy at least one of the following conditions:

The value of PUSCH_Num is the same as the number of PUSCHs in Allocation_Set determined based on the time domain resource assignment field.

The value of PUSCH_Num is less than or equal to the number of PUSCHs in Allocation_Set determined based on the time domain resource assignment field. When the value of PUSCH_Num is less than the number of PUSCHs in Allocation_Set determined based on the time domain resource assignment field, the first PUSCH_Num Allocation_Indexes are obtained from determined Allocation_Set, to determine the transmission attribute of each scheduled PUSCH.

For example, if PUSCH_Num is 2 and the number of PUSCHs in Allocation_Set is 4, transmission parameters of PUSCHs actually scheduled by the network device are determined based on transmission parameters corresponding to the first and second Allocation_Indexes configured in Allocation_Set.

Optionally, the first indication information is transmitted in a time domain resource assignment field, or the first indication information is transmitted in a time domain resource assignment 2 field added to DCI.

During scheduling, the base station indicates an ID of an Allocation_Set in a configured Allocation_Set_Table by scheduling the time domain resource assignment field or the time domain resource assignment 2 field in DCI. That is, if the value of the time domain resource assignment field/the time domain resource assignment 2 field is m, Allocation_Set whose ID is m is used. When the additional time domain resource assignment 2 field is newly introduced in the scheduling DCI, the number of bits in the time domain resource assignment 2 field can be set to ceiling (log 2 (Max_Allocation_Set_ID+1)), where ceiling 0 is a rounding up operation, Max_Allocation_Set_ID is the maximum value of the ID of Allocation_Set, and the ID of Allocation_Set can be numbered from 0. That is, the number of bits in the time domain resource assignment field or the time domain resource assignment 2 field is a value obtained by rounding up log 2 (X), and X is the number of preconfigured resource allocation sets, or X is the maximum value of a resource allocation set identifier+1.

Optionally, after the determining transmission parameters of the N physical channels according to the resource allocation set, the method further includes:

in a case that the transmission parameter determined according to the resource allocation set does not include a mapping type, determining a mapping type of a DM-RS of the physical channel according to the time domain transmission resource of the physical channel.

When the transmission parameter does not include the mapping type, that is, when the mapping type is implicitly determined, a DM-RS mapping type of a physical channel can be determined based on a predefined rule. For example, only when the PUSCH occupies the first symbol of the slot and the number of allocated consecutive symbols>=4, Type A is used. Type B is used in other cases.

However, it should be understood that the foregoing rule is only an example, and the specific embodiment of the present disclosure may also set other rules for determining the mapping type according to scenarios and requirements.

Optionally, the resource allocation set corresponds to at least N first transmission parameter groups. The at least N first transmission parameter groups include N first transmission parameter groups in a one-to-one correspondence with the N physical channels, and each of the first transmission parameter groups includes an offset parameter and a position parameter;

the offset parameter is used to indicate a slot offset between a slot of a corresponding physical channel and a slot of the DCI; and the position parameter is used to indicate a time domain position of a corresponding physical channel in a slot.

In a specific embodiment of the present disclosure, the resource allocation set corresponds to at least N first transmission parameter groups, and it can also be understood as that the resource allocation set is used to configure at least N first transmission parameter groups.

This configuration can be direct configuration or indirect configuration, for example, N Allocation_Indexes are configured for the resource allocation set, and each Allocation_Index indicates a first transmission parameter group.

Specifically, the offset parameter can be understood as K2, and the position parameter can be understood as SLIV or S and L. A slot of a physical channel can be determined according to the offset parameter, and a time domain position of the physical channel in a slot can be determined according to the position parameter.

That is, in the foregoing implementation, each first transmission parameter group is a dedicated transmission parameter group.

Optionally, the resource allocation set corresponds to at least N−1 second transmission parameter groups;

the at least N−1 second transmission parameter groups include N−1 second transmission parameter groups in a one-to-one correspondence with physical channels of the N physical channels other than the first physical channel, and each of the second transmission parameter groups includes a length parameter or includes a start parameter and a length parameter;

the start parameter is used to indicate a start symbol of a corresponding physical channel in a slot;

the length parameter is used to indicate the number of consecutive symbols occupied by a corresponding physical channel; and the DCI further includes third indication information, and the third indication information is used to indicate a target transmission parameter group of the first physical channel of the N physical channels.

Specifically, the network device indicates the target transmission parameter group of the first physical channel of the N physical channels in the third indication information, and the third indication information may be identifier information of the target transmission parameter group; or the third indication information may be index information of the target transmission parameter group. The network device determines transmission parameters of physical channels of the N physical channels other than the first physical channel based on the resource allocation set.

When each of the second transmission parameter groups includes a length parameter, among the N physical channels determined according to the target transmission parameter group and N−1 second transmission parameter groups, there is no gap between adjacent physical channels, that is, among adjacent PUSCHs, a next symbol of the end symbol of the previous PUSCH is the first symbol of the next PUSCH.

When each of the second transmission parameter groups includes a start parameter and a length parameter, among the N physical channels determined according to the target transmission parameter group and N−1 second transmission parameter groups, there is no gap between adjacent physical channels, that is, among adjacent PUSCHs, a next symbol of the end symbol of the previous PUSCH is the first symbol of the next PUSCH. In addition, there may also be a gap between adjacent physical channels, that is, among adjacent PUSCHs, a next symbol of the end symbol of the previous PUSCH is not the first symbol of the next PUSCH. That is, the configuration in this embodiment can be applied to the case in which the physical channel is continuous in the time domain, and can also be applied to a case in which the physical channel is discontinuous in the time domain.

In the foregoing implementation, each second transmission parameter group is a dedicated transmission parameter group.

Optionally, in implementation 1, each of the first transmission parameter groups includes an offset parameter and a position parameter. However, the offset parameter does not need to be configured separately for each Allocation_Index, and can be configured for each Allocation_Set.

Moreover, when multiple physical channels are continuous in the time domain, if the start point of the first physical channel can be determined, a transmission parameter group corresponding to each physical channel only needs to be configured with a length, to determine all transmission parameters of the physical channels.

Based on the foregoing two aspects, in implementation 2 (refer to implementation 2 in the embodiment shown in FIG. 1), the resource allocation set corresponds to a third transmission parameter group and at least N fourth transmission parameter groups (it may also be understood as that the resource allocation set is configured with the third transmission parameter group and the at least N fourth transmission parameter groups); or corresponds to a fifth transmission parameter group and at least N sixth transmission parameter groups;

the third transmission parameter group includes: an offset parameter and a start parameter;
the at least N fourth transmission parameter groups include N fourth transmission parameter groups in a one-to-one correspondence with the N physical channels, and each of the fourth transmission parameter groups includes a length parameter;
the fifth transmission parameter group includes: an offset parameter;
the at least N sixth transmission parameter groups include N sixth transmission parameter groups in a one-to-one correspondence with the N physical channels, and each of the sixth transmission parameter groups includes a start parameter and a length parameter;
the offset parameter is used to indicate a slot offset between a slot of the first physical channel of the N physical channels and a slot of the DCI;
the start parameter is used to indicate a start symbol of the first physical channel of the N physical channels in a slot; and
the length parameter is used to indicate the number of consecutive symbols occupied by a corresponding physical channel.

In the above solution, the case in which the resource allocation set corresponds to the third transmission parameter group and the at least N fourth transmission parameter groups can be applied to a case in which physical channels are continuous in the time domain, and the other configuration can be applied to all cases in which physical channels are continuous or discontinuous in the time domain. In the above case, each of the fourth transmission parameter group and the sixth transmission parameter group is a dedicated transmission parameter group.

Optionally, the first transmission parameter group, the second transmission parameter group, the fourth transmission parameter group, or the sixth transmission parameter group further includes a mapping type parameter, and the mapping type parameter is used to indicate a mapping type of a DM-RS corresponding to the physical channel.

Mapping types (Mapping Type) of a demodulation reference signal (Demodulation Reference Signal, DM-RS for short) can include a first type (Type A) and a second type (Type B). Limitation for S and L in these two types is shown in Table 1. Type A requires that the allocated symbols always start from the first symbol of a slot, while Type B basically has no restrictions on the start positions and the number of allocated symbols and the time domain resource assignment is more flexible.

Figure 3:
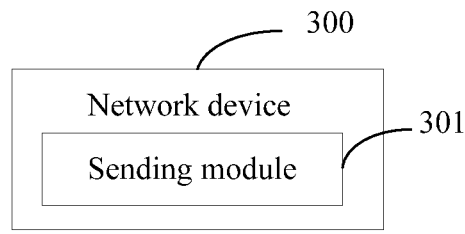
FIG. 3 is a first structural diagram of a network device according to some embodiments of the present disclosure.

Referring to FIG. 3, FIG. 3 is a structural diagram of a network device according to some embodiments of the present disclosure. As shown in FIG. 3, the network device 300 includes: a sending module 301.

The sending module 301 is configured to send downlink control information DCI for scheduling N physical channels, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, the dedicated transmission parameter group is only used to determine a transmission parameter of a corresponding physical channel, and N is an integer greater than or equal to 1.

Optionally, at least one of the N physical channels is mapped to a mini-slot.

Optionally, the first indication information is: identifier information of the resource allocation set; or index information of the resource allocation set. Optionally, the first indication information is transmitted in a time domain resource assignment field, or the first indication information is transmitted in a time domain resource assignment 2 field added to DCI.

Optionally, the number of bits in the time domain resource assignment field or the time domain resource assignment 2 field is a value obtained by rounding up log 2 (X), and X is the number of preconfigured resource allocation sets, or X is the maximum value of a resource allocation set identifier+1.

Optionally, the DCI further includes second indication information, used to indicate a value of N.

Optionally, the resource allocation set corresponds to at least N first transmission parameter groups;
- the at least N first transmission parameter groups include N first transmission parameter groups in a one-to-one correspondence with the N physical channels, and each of the first transmission parameter groups includes an offset parameter and a position parameter;
- the offset parameter is used to indicate a slot offset between a slot of a corresponding physical channel and a slot of the DCI; and
- the position parameter is used to indicate a time domain position of a corresponding physical channel in a slot.

Optionally, the resource allocation set corresponds to at least N-1 second transmission parameter groups;
- the at least N-1 second transmission parameter groups include N-1 second transmission parameter groups in a one-to-one correspondence with physical channels of the N physical channels other than the first physical channel, and each of the second transmission parameter groups includes a length parameter or includes a start parameter and a length parameter;
- the start parameter is used to indicate a start symbol of a corresponding physical channel in a slot;
- the length parameter is used to indicate the number of consecutive symbols occupied by a corresponding physical channel; and
- the DCI further includes third indication information, and the third indication information is used to indicate a target transmission parameter group of the first physical channel of the N physical channels.

Optionally, the third indication information is identifier information of the target transmission parameter group; or the third indication information is index information of the target transmission parameter group.

Optionally, the resource allocation set corresponds to a third transmission parameter group and at least N fourth transmission parameter groups; or corresponds to a fifth transmission parameter group and at least N sixth transmission parameter groups;
- the third transmission parameter group includes: an offset parameter and a start parameter;
- the at least N fourth transmission parameter groups include N fourth transmission parameter groups in a one-to-one correspondence with the N physical channels, and each of the fourth transmission parameter groups includes a length parameter;
- the fifth transmission parameter group includes: an offset parameter;
- the at least N sixth transmission parameter groups include N sixth transmission parameter groups in a one-to-one correspondence with the N physical channels, and each of the sixth transmission parameter groups includes a start parameter and a length parameter;
- the offset parameter is used to indicate a slot offset between a slot of the first physical channel of the N physical channels and a slot of the DCI;
- the start parameter is used to indicate a start symbol of the first physical channel of the N physical channels in a slot; and
- the length parameter is used to indicate the number of consecutive symbols occupied by a corresponding physical channel.

Optionally, the first transmission parameter group, the second transmission parameter group, the fourth transmission parameter group, or the sixth transmission parameter group further includes a mapping type parameter, and the mapping type parameter is used to indicate a mapping type of a DM-RS corresponding to the physical channel.

Optionally, time domain transmission resources of each physical channel that are determined according to the transmission parameter are located in the same slot; or time domain transmission resources of different physical channels that are determined according to the transmission parameter do not overlap.

The network device 300 can implement each process implemented by the network device in the method embodiment in FIG. 1. To avoid repetition, details are not described herein again.

The network device 300 of some embodiments of the present disclosure sends downlink control information DCI for scheduling N physical channels, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, the dedicated transmission parameter group is only used to determine a transmission parameter of a corresponding physical channel, and N is an integer greater than or equal to 1. In this way, the network device can determine transmission parameters of one or more physical channels by setting the resource allocation set, and flexibly adjust the number of determined physical channels and transmission parameters of the physical channels.

Figure 4:
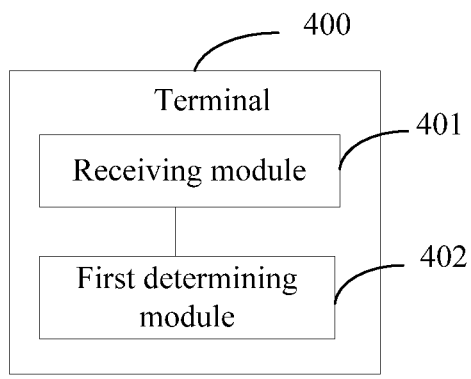
FIG. 4 is a first structural diagram of a terminal according to some embodiments of the present disclosure.

Referring to FIG. 4, FIG. 4 is a structural diagram of a terminal according to some embodiments of the present disclosure. As shown in FIG. 4, the terminal 400 includes: a receiving module 401 and a first determining module 402.

The receiving module 401 is configured to receive downlink control information DCI for scheduling N physical channels, where the DCI includes first indication information, the first indication information is used to indicate a resource allocation set, and N is an integer greater than or equal to 1.

The first determining module 402 is configured to determine transmission parameters of the N physical channels according to the resource allocation set.

Optionally, the DCI further includes second indication information, used to indicate a value of N. The first determining module is configured to:
- in a case that the number of transmission parameter groups determined according to the transmission resource allocation set is greater than N, select the first N transmission parameter groups as transmission parameters of the N physical channels.

Optionally, the value of N is determined according to the transmission resource allocation set.

Optionally, the first indication information is: identifier information of the resource allocation set; or index information of the resource allocation set.

Optionally, the first indication information is transmitted in a time domain resource assignment field, or the first indication information is transmitted in a time domain resource assignment 2 field added to DCI.

Optionally, the number of bits in the time domain resource assignment field or the time domain resource assignment 2 field is a value obtained by rounding up log 2 (X), and X is the number of preconfigured resource allocation sets, or X is the maximum value of a resource allocation set identifier +1.

Optionally, the terminal 400 further includes:

a second determining module, configured to: in a case that the transmission parameter determined according to the resource allocation set does not include a mapping type, determine a mapping type of a DM-RS of the physical channel according to the time domain transmission resource of the physical channel.

Optionally, the resource allocation set corresponds to at least N first transmission parameter groups;

the at least N first transmission parameter groups include N first transmission parameter groups in a one-to-one correspondence with the N physical channels, and each of the first transmission parameter groups includes an offset parameter and a position parameter;

the offset parameter is used to indicate a slot offset between a slot of a corresponding physical channel and a slot of the DCI; and the position parameter is used to indicate a time domain position of a corresponding physical channel in a slot.

Optionally, the resource allocation set corresponds to at least N−1 second transmission parameter groups;

the at least N−1 second transmission parameter groups include N−1 second transmission parameter groups in a one-to-one correspondence with physical channels of the N physical channels other than the first physical channel, and each of the second transmission parameter groups includes a length parameter or includes a start parameter and a length parameter;

the start parameter is used to indicate a start symbol of a corresponding physical channel in a slot;

the length parameter is used to indicate the number of consecutive symbols occupied by a corresponding physical channel; and the DCI further includes third indication information, and the third indication information is used to indicate a target transmission parameter group of the first physical channel of the N physical channels.

Optionally, the third indication information is identifier information of the target transmission parameter group; or the third indication information is index information of the target transmission parameter group.

Optionally, the resource allocation set corresponds to a third transmission parameter group and at least N fourth transmission parameter groups; or corresponds to a fifth transmission parameter group and at least N sixth transmission parameter groups;

the third transmission parameter group includes: an offset parameter and a start parameter;

the at least N fourth transmission parameter groups include N fourth transmission parameter groups in a one-to-one correspondence with the N physical channels, and each of the fourth transmission parameter groups includes a length parameter;

the fifth transmission parameter group includes: an offset parameter;

the at least N sixth transmission parameter groups include N sixth transmission parameter groups in a one-to-one correspondence with the N physical channels, and each of the sixth transmission parameter groups includes a start parameter and a length parameter;

the offset parameter is used to indicate a slot offset between a slot of the first physical channel of the N physical channels and a slot of the DCI;

the start parameter is used to indicate a start symbol of the first physical channel of the N physical channels in a slot; and the length parameter is used to indicate the number of consecutive symbols occupied by a corresponding physical channel.

Optionally, the first transmission parameter group, the second transmission parameter group, the fourth transmission parameter group, or the sixth transmission parameter group further includes a mapping type parameter, and the mapping type parameter is used to indicate a mapping type of a DM-RS corresponding to the physical channel.

Optionally, time domain transmission resources of each physical channel that are determined according to the transmission parameter are located in the same slot; or time domain transmission resources of different physical channels that are determined according to the transmission parameter do not overlap.

The terminal 400 in some embodiments of the present disclosure receives downlink control information DCI for scheduling N physical channels, where the DCI includes first indication information, the first indication information is used to indicate a resource allocation set, configuration of the resource allocation set includes a dedicated transmission parameter group corresponding to a physical channel, the dedicated transmission parameter group is only used to determine a transmission parameter of a corresponding physical channel, and N is an integer greater than or equal to 1. The transmission parameters of the N physical channels are determined according to the resource allocation set. In this way, the terminal can determine transmission parameters of one or more physical channels according to the resource allocation set, and the network device can flexibly adjust the number of allocated physical channels and transmission parameters of the physical channels according to the resource allocation set.

Figure 5:
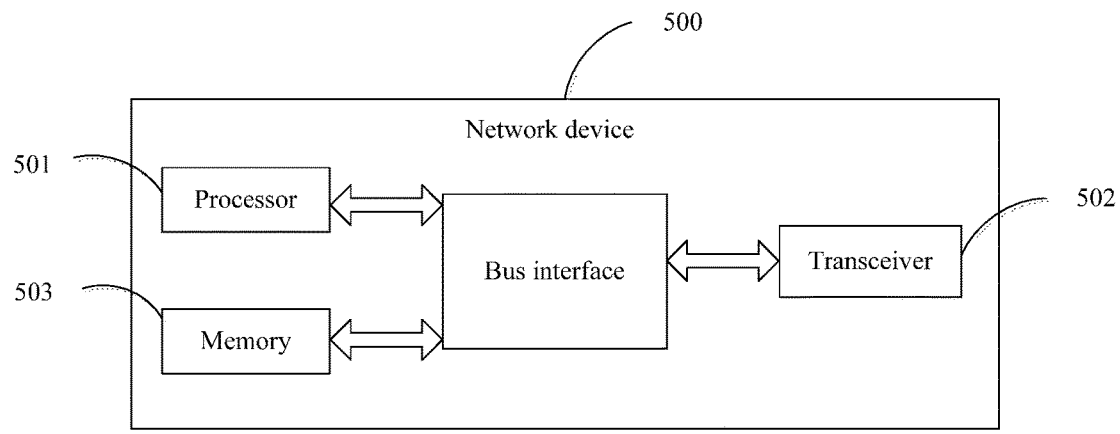
FIG. 5 is a second structural diagram of a network device according to some embodiments of the present disclosure.

FIG. 5 is a structural diagram of a network side device according to some embodiments of the present disclosure. As shown in FIG. 5, a network device 500 includes: a processor 501, a transceiver 502, a memory 503, and a bus interface.

The transceiver 502 is configured to send downlink control information DCI for scheduling N physical channels, where the DCI includes first indication information, the first indication information is used to indicate a resource allocation set, the resource allocation set is used to determine transmission parameters of the N physical channels, configuration of the resource allocation set includes a dedicated transmission parameter group corresponding to a physical channel, the dedicated transmission parameter group is only used to determine a transmission parameter of a corresponding physical channel, and N is an integer greater than or equal to 1.

Optionally, at least one of the N physical channels is mapped to a mini-slot.

Optionally, the first indication information is: identifier information of the resource allocation set; or index information of the resource allocation set.

Optionally, the first indication information is transmitted in a time domain resource assignment field, or the first indication information is transmitted in a time domain resource assignment 2 field added to DCI.

Optionally, the number of bits in the time domain resource assignment field or the time domain resource assignment 2 field is a value obtained by rounding up log 2 (X), and X is the number of preconfigured resource allocation sets, or X is the maximum value of a resource allocation set identifier +1.

Optionally, the DCI further includes second indication information, used to indicate a value of N.

Optionally, the resource allocation set corresponds to at least N first transmission parameter groups;
   the at least N first transmission parameter groups include N first transmission parameter groups in a one-to-one correspondence with the N physical channels, and each of the first transmission parameter groups includes an offset parameter and a position parameter;
   the offset parameter is used to indicate a slot offset between a slot of a corresponding physical channel and a slot of the DCI; and
   the position parameter is used to indicate a time domain position of a corresponding physical channel in a slot.

Optionally, the resource allocation set corresponds to at least N−1 second transmission parameter groups;
   the at least N−1 second transmission parameter groups include N−1 second transmission parameter groups in a one-to-one correspondence with physical channels of the N physical channels other than the first physical channel, and each of the second transmission parameter groups includes a length parameter or includes a start parameter and a length parameter;
   the start parameter is used to indicate a start symbol of a corresponding physical channel in a slot;
   the length parameter is used to indicate the number of consecutive symbols occupied by a corresponding physical channel; and
   the DCI further includes third indication information, and the third indication information is used to indicate a target transmission parameter group of the first physical channel of the N physical channels.

Optionally, the third indication information is identifier information of the target transmission parameter group; or the third indication information is index information of the target transmission parameter group.

Optionally, the resource allocation set corresponds to a third transmission parameter group and at least N fourth transmission parameter groups; or corresponds to a fifth transmission parameter group and at least N sixth transmission parameter groups;
   the third transmission parameter group includes: an offset parameter and a start parameter;
   the at least N fourth transmission parameter groups include N fourth transmission parameter groups in a one-to-one correspondence with the N physical channels, and each of the fourth transmission parameter groups includes a length parameter;
   the fifth transmission parameter group includes: an offset parameter;
   the at least N sixth transmission parameter groups include N sixth transmission parameter groups in a one-to-one correspondence with the N physical channels, and each of the sixth transmission parameter groups includes a start parameter and a length parameter;
   the offset parameter is used to indicate a slot offset between a slot of the first physical channel of the N physical channels and a slot of the DCI;
   the start parameter is used to indicate a start symbol of the first physical channel of the N physical channels in a slot; and
   the length parameter is used to indicate the number of consecutive symbols occupied by a corresponding physical channel.

Optionally, the first transmission parameter group, the second transmission parameter group, the fourth transmission parameter group, or the sixth transmission parameter group further includes a mapping type parameter, and the mapping type parameter is used to indicate a mapping type of a DM-RS corresponding to the physical channel.

Optionally, time domain transmission resources of each physical channel that are determined according to the transmission parameter are located in the same slot; or time domain transmission resources of different physical channels that are determined according to the transmission parameter do not overlap.

The network device 500 of some embodiments of the present disclosure sends downlink control information DCI for scheduling N physical channels, where the DCI includes first indication information, the first indication information is used to indicate a resource allocation set, the resource allocation set is used to determine transmission parameters of the N physical channels, and N is an integer greater than or equal to 1. In this way, the network device can determine transmission parameters of one or more physical channels by setting the resource allocation set, and flexibly adjust the number of determined physical channels and transmission parameters of the physical channels.

Figure 6:
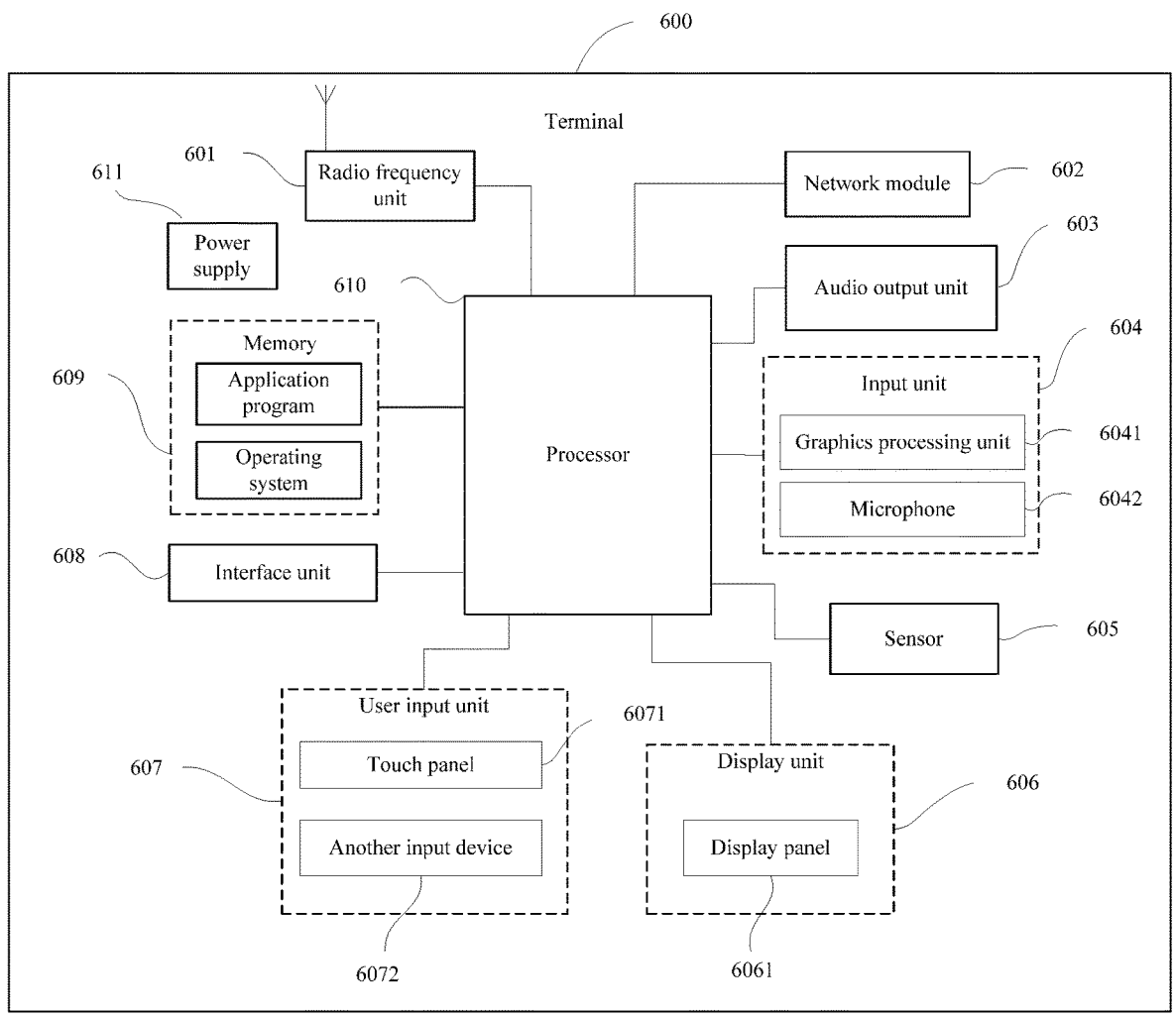
FIG. 6 is a second structural diagram of a terminal according to some embodiments of the present disclosure.

FIG. 6 is a schematic diagram of a hardware structure of a terminal implementing the various embodiments of the present disclosure. As shown in FIG. 6, the terminal 600 includes, but not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. A person skilled in the art may understand that the structure of the terminal shown in FIG. 6 does not constitute a limitation to the terminal. The terminal may include more or fewer components than that shown in the figure, or a combination of some components, or an arrangement of different components. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 601 is configured to receive downlink control information DCI for scheduling N physical channels, where the DCI includes first indication information, the first indication information is used to indicate a resource allocation set, and N is an integer greater than or equal to 1.

The processor 610 is configured to determine transmission parameters of the N physical channels according to the resource allocation set.

Optionally, the DCI further includes second indication information, used to indicate a value of N, and the determining transmission parameters of the N physical channels according to the resource allocation set specifically includes:
   in a case that the number of transmission parameter groups determined according to the transmission resource allocation set is greater than N, select the first N transmission parameter groups as transmission parameters of the N physical channels.

Optionally, the value of N is determined according to the transmission resource allocation set.

Optionally, the first indication information is: identifier information of the resource allocation set; or index information of the resource allocation set.

Optionally, the first indication information is transmitted in a time domain resource assignment field, or the first indication information is transmitted in a time domain resource assignment 2 field added to DCI.

Optionally, the number of bits in the time domain resource assignment field or the time domain resource assignment 2 field is a value obtained by rounding up log 2 (X), and X is the number of preconfigured resource allocation sets, or X is the maximum value of a resource allocation set identifier +1.

Optionally, the processor 610 is further configured to:
in a case that the transmission parameter determined according to the resource allocation set does not include a mapping type, determine a mapping type of a DM-RS of the physical channel according to the time domain transmission resource of the physical channel.

Optionally, the resource allocation set corresponds to at least N first transmission parameter groups;
the at least N first transmission parameter groups include N first transmission parameter groups in a one-to-one correspondence with the N physical channels, and each of the first transmission parameter groups includes an offset parameter and a position parameter;
the offset parameter is used to indicate a slot offset between a slot of a corresponding physical channel and a slot of the DCI; and
the position parameter is used to indicate a time domain position of a corresponding physical channel in a slot.

Optionally, the resource allocation set corresponds to at least N−1 second transmission parameter groups;
the at least N−1 second transmission parameter groups include N−1 second transmission parameter groups in a one-to-one correspondence with physical channels of the N physical channels other than the first physical channel, and each of the second transmission parameter groups includes a length parameter or includes a start parameter and a length parameter;
the start parameter is used to indicate a start symbol of a corresponding physical channel in a slot;
the length parameter is used to indicate the number of consecutive symbols occupied by a corresponding physical channel; and
the DCI further includes third indication information, and the third indication information is used to indicate a target transmission parameter group of the first physical channel of the N physical channels.

Optionally, the third indication information is identifier information of the target transmission parameter group; or the third indication information is index information of the target transmission parameter group.

Optionally, the resource allocation set corresponds to a third transmission parameter group and at least N fourth transmission parameter groups; or corresponds to a fifth transmission parameter group and at least N sixth transmission parameter groups;
the third transmission parameter group includes: an offset parameter and a start parameter;
the at least N fourth transmission parameter groups include N fourth transmission parameter groups in a one-to-one correspondence with the N physical channels, and each of the fourth transmission parameter groups includes a length parameter;
the fifth transmission parameter group includes: an offset parameter;
the at least N sixth transmission parameter groups include N sixth transmission parameter groups in a one-to-one correspondence with the N physical channels, and each of the sixth transmission parameter groups includes a start parameter and a length parameter;
the offset parameter is used to indicate a slot offset between a slot of the first physical channel of the N physical channels and a slot of the DCI;
the start parameter is used to indicate a start symbol of the first physical channel of the N physical channels in a slot; and
the length parameter is used to indicate the number of consecutive symbols occupied by a corresponding physical channel.

Optionally, the first transmission parameter group, the second transmission parameter group, the fourth transmission parameter group, or the sixth transmission parameter group further includes a mapping type parameter, and the mapping type parameter is used to indicate a mapping type of a DM-RS corresponding to the physical channel.

Optionally, time domain transmission resources of each physical channel that are determined according to the transmission parameter are located in the same slot; or time domain transmission resources of different physical channels that are determined according to the transmission parameter do not overlap.

The terminal 600 can implement processes implemented by the terminal in the foregoing method embodiments. To avoid repetition, details are not described herein again.

The terminal 600 in some embodiments of the present disclosure receives downlink control information DCI for scheduling N physical channels, where the DCI includes first indication information, the first indication information is used to indicate a resource allocation set, configuration of the resource allocation set includes a dedicated transmission parameter group corresponding to a physical channel, the dedicated transmission parameter group is only used to determine a transmission parameter of a corresponding physical channel, and N is an integer greater than or equal to 1. The transmission parameters of the N physical channels are determined according to the resource allocation set. In this way, the terminal can determine transmission parameters of one or more physical channels according to the resource allocation set, and the network device can flexibly adjust the number of allocated physical channels and transmission parameters of the physical channels according to the resource allocation set.

It should be understood that, in some embodiments of the present disclosure, the radio frequency unit 601 may be configured to receive and transmit information or a signal in a call process. Specifically, after downlink data from a base station is received, the radio frequency unit transmits the downlink data to the processor 610 for processing. In addition, the radio frequency unit transmits uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may also communicate with other devices through a wireless communication system and network.

The terminal provides wireless broadband Internet access for the user by using the network module 602, for example, helping the user to send and receive an e-mail, browse a web page, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive audio or radio frequency signals. The input unit 604 may include a graphics processing unit (GPU) 6041 and a microphone 6042. The graphics processing unit 6041 processes image data of a static picture or video obtained by an image capture apparatus (such as a camera) in a video capture mode or an image capture mode. A processed image frame can be displayed on the display unit 606. The image frame processed by the graphics processing unit 6041 may be stored in the memory 609 (or another storage medium) or sent by using the radio frequency unit 601 or the network module 602. The microphone 6042 may receive sound and can process the sound into audio data. The processed audio data can be converted into a format that can be sent to a mobile communications base station through the radio frequency unit 601 in a telephone call mode, for outputting.

The terminal 600 further includes at least one sensor 605, for example, a light sensor, a motion sensor, and another sensor. Specifically, the light sensor includes an ambient light sensor and a proximity sensor. The ambient light sensor may adjust luminance of the display panel 6061 based on brightness of ambient light. The proximity sensor may turn off the display panel 6061 and/or backlight when the terminal 600 moves to an ear. As a motion sensor, an accelerometer sensor can detect magnitude of acceleration in various directions (usually three axes), can detect magnitude and the direction of gravity when stationary, can be configured to identify terminal postures (such as switching between a landscape mode and a portrait mode, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 may be configured to receive input digit or character information, and generate key signal inputs related to user settings and function control of the terminal. In particular, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 may be implemented as a resistive type, a capacitive type, an infrared type, a surface acoustic wave type, or the like. In addition to the touch panel 6071, the user input unit 607 may further include the other input devices 6072. Specifically, the other input devices 6072 may include, but are not limited to, a physical keyboard, a function key (for example, a volume control key or a switch key), a trackball, a mouse, and a joystick. Details are not described herein.

Optionally, the touch panel 6071 can cover the display panel 6061. When detecting a touch operation on or near the touch panel, the touch panel 6071 transmits the touch operation to the processor 610 to determine a type of a touch event. Then, the processor 610 provides corresponding visual output on the display panel 6061 based on the type of the touch event. Although in FIG. 6, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 608 may be configured to receive an input (for example, data information or power) from an external apparatus and transmit the received input to one or more elements in the terminal 600, or transmit data between the terminal 600 and the external apparatus.

The memory 609 may be configured to store a software program and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory, and may further include a nonvolatile memory, for example, at least one disk storage device, a flash memory, or other volatile solid-state storage devices.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor and a modem processor. The application processor mainly deals with an operating system, a user interface, and an application. The modem processor mainly deals with wireless communication. It may be understood that, alternatively, the modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules that are not shown. Details are not described herein.

Optionally, some embodiments of the present disclosure further provide an electronic device, including a processor 610, a memory 609, and a program stored in the memory 609 and executable on the processor 610. When the program is executed by the processor 610, the processes of the embodiment of the scheduling method in FIG. 1 are implemented, or when the program is executed by the processor 610, the processes of the embodiment of the scheduling method in FIG. 2 are implemented, and the same technical effects can be achieved. To avoid repetition, details are not described herein again.

Some embodiments of the present disclosure further provide a computer-readable storage medium. The computer-readable storage medium stores a computer program, and When the computer program is executed by the processor, the processes of the embodiment of the scheduling method in FIG. 1 are implemented, or when the computer program is executed by the processor, the processes of the embodiment of the scheduling method in FIG. 2 are implemented; the same beneficial effects can be achieved. To avoid repetition, details are not described herein again.

The computer readable storage medium may be a read-only memory (ROM), a random access memory (RAM), a magnetic disk, a compact disc, or the like.

It may be understood that the embodiments described in some embodiments of the present disclosure may be implemented by hardware, software, firmware, middleware, microcode, or a combination thereof. For implementation with hardware, the module, unit, and subunit may be implemented in one or more application specific integrated circuits (ASIC), a digital signal processor (DSP), a DSP device (DSPD), a programmable logic device (PLD), a field-programmable gate array (FPGA), general processors, controllers, micro-controllers, micro-processors, and other electronic units for implementing the functions of the present application, or their combinations.

For implementation with software, the technology described in some embodiments of the present disclosure may be implemented by executing functional modules (for example, a process and a function) described in some embodiments of the present disclosure. Software codes can be stored in the memory and executed by the processor. The memory may be implemented inside or outside the processor.

Therefore, the objectives of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A scheduling method, applied to a terminal and comprising:
  receiving downlink control information DCI for scheduling N physical channels, wherein the DCI comprises first indication information, the first indication information is used to indicate a resource allocation set, configuration of the resource allocation set comprises a dedicated transmission parameter group corresponding to a physical channel, and N is an integer greater than or equal to 1; and
  determining transmission parameters of the N physical channels according to the resource allocation set;
  wherein:
  the resource allocation set corresponds to an offset parameter and at least N transmission parameter groups;
  the at least N transmission parameter groups comprise N transmission parameter groups in a one-to-one correspondence with the N physical channels, and each of the at least N transmission parameter groups comprises a start parameter and a length parameter;
  the offset parameter is used to indicate a slot offset between a slot of the first physical channel of the N physical channels and a slot of the DCI;
  the start parameter is used to indicate a start symbol of one physical channel of the N physical channels in a slot; and
  the length parameter is used to indicate the number of consecutive symbols occupied by a corresponding physical channel.

2. The scheduling method according to claim 1, wherein the DCI further comprises second indication information, used to indicate a value of N, and the determining transmission parameters of the N physical channels according to the resource allocation set specifically comprises:
  in response to the number of transmission parameter groups determined according to the transmission resource allocation set being greater than N, selecting the first N transmission parameter groups as transmission parameters of the N physical channels;
wherein the value of N is determined according to the transmission resource allocation set.

3. The scheduling method according to claim 1, wherein the first indication information is:
identifier information of the resource allocation set; or
index information of the resource allocation set.

4. The scheduling method according to claim 1, wherein the first indication information is transmitted in a time domain resource assignment field, or the first indication information is transmitted in a time domain resource assignment 2 field added to DCI;
wherein the number of bits in the time domain resource assignment field or the time domain resource assignment 2 field is a value obtained by rounding up log 2 (X), and X is the number of preconfigured resource allocation sets, or X is the maximum value of a resource allocation set identifier +1.

5. The scheduling method according to claim 1, wherein the number N of physical channels scheduled by the DCI is determined according to the number of row indexes in the resource allocation set, and the row indexes indicate Start and length indicator value (SLIV) or the row indexes indicate Start (S) and Length (L).

6. The scheduling method according to claim 1, wherein the number N of physical channels scheduled by the DCI is determined according to the number of the at least N transmission parameter groups corresponding to the resource allocation set.

7. The method according to claim 1, wherein the physical channel is a Physical Uplink Shared Channel (PUSCH) or a Physical Downlink Shared Channel (PDSCH).

8. The method according to claim 1, wherein transmission parameter group further includes a mapping type parameter, and the mapping type parameter is used to indicate a mapping type of a DM-RS corresponding to the physical channel.

9. A network device, comprising a processor, a memory, and a program stored in the memory and executable on the processor, wherein the program, when executed by the processor, implements a scheduling method, the scheduling method comprises:
sending downlink control information DCI for scheduling N physical channels, wherein the DCI comprises first indication information, the first indication information is used to indicate a resource allocation set, the resource allocation set is used to determine transmission parameters of the N physical channels, configuration of the resource allocation set comprises a dedicated transmission parameter group corresponding to a physical channel, and N is an integer greater than or equal to 1;
wherein:
the resource allocation set corresponds to an offset parameter and at least N transmission parameter groups;
the at least N transmission parameter groups comprise N transmission parameter groups in a one-to-one correspondence with the N physical channels, and each of the transmission parameter groups comprises a start parameter and a length parameter;
the offset parameter is used to indicate a slot offset between a slot of the first physical channel of the N physical channels and a slot of the DCI;
the start parameter is used to indicate a start symbol of one physical channel of the N physical channels in a slot; and
the length parameter is used to indicate the number of consecutive symbols occupied by a corresponding physical channel.

10. The network device according to claim 9, wherein the first indication information is:
identifier information of the resource allocation set; or
index information of the resource allocation set; or,
wherein the first indication information is transmitted in a time domain resource assignment field, or the first indication information is transmitted in a time domain resource assignment 2 field added to DCI.

11. The network device according to claim 9, wherein the number N of physical channels scheduled by the DCI is determined according to the number of row indexes in the resource allocation set, and the row indexes indicate Start and length indicator value (SLIV) or the row indexes indicate Start (S) and Length (L).

12. The network device according to claim 9, wherein the number N of physical channels scheduled by the DCI is determined according to the number of the at least N transmission parameter groups corresponding to the resource allocation set.

13. The network device according to claim 9, wherein the DCI further comprises second indication information used to indicate a value of N.

14. The network device according to claim 9, wherein the first indication information is transmitted in a time domain resource assignment field, or the first indication information is transmitted in a time domain resource assignment 2 field added to DCI;
wherein the number of bits in the time domain resource assignment field or the time domain resource assignment 2 field is a value obtained by rounding up log 2 (X), and X is the number of preconfigured resource allocation sets, or X is the maximum value of a resource allocation set identifier +1.

15. The network device according to claim 9, wherein the physical channel is a Physical Uplink Shared Channel (PUSCH) or a Physical Downlink Shared Channel (PDSCH).

16. The network device according to claim 9, wherein transmission parameter group further includes a mapping type parameter, and the mapping type parameter is used to indicate a mapping type of a DM-RS corresponding to the physical channel.

17. A terminal, comprising a processor, a memory, and a program stored in the memory and executable on the processor, wherein the program, when executed by the processor, implements a scheduling method, wherein the scheduling method comprises:
sending downlink control information DCI for scheduling N physical channels, wherein the DCI comprises first indication information, the first indication information is used to indicate a resource allocation set, the resource allocation set is used to determine transmission parameters of the N physical channels, configuration of the resource allocation set comprises a dedicated transmission parameter group corresponding to a physical channel, and N is an integer greater than or equal to 1;
wherein:
the resource allocation set corresponds to an offset parameter and at least N transmission parameter groups;
the at least N transmission parameter groups comprise N transmission parameter groups in a one-to-one correspondence with the N physical channels, and each of the transmission parameter groups comprises a start parameter and a length parameter;

the offset parameter is used to indicate a slot offset between a slot of the first physical channel of the N physical channels and a slot of the DCI;

the start parameter is used to indicate a start symbol of one physical channel of the N physical channels in a slot; and the length parameter is used to indicate the number of consecutive symbols occupied by a corresponding physical channel.

18. The terminal according to claim 17, wherein the number N of physical channels scheduled by the DCI is determined according to the number of row indexes in the resource allocation set, and the row indexes indicate Start and length indicator value (SLIV) or the row indexes indicate Start (S) and Length (L).

19. The terminal according to claim 17, wherein the number N of physical channels scheduled by the DCI is determined according to the number of the at least N transmission parameter groups corresponding to the resource allocation set.

20. The terminal according to claim 17, wherein the first indication information is transmitted in a time domain resource assignment field, or the first indication information is transmitted in a time domain 2 field added resource assignment to DCI; wherein the number of bits in the time domain resource assignment field or the time domain resource assignment 2 field is a value obtained by rounding up log 2 (X), and X is the number of preconfigured resource allocation sets, or X is the maximum value of a resource allocation set identifier +1.

* * * * *